US011432464B2

(12) United States Patent
Hayashi et al.

(10) Patent No.: US 11,432,464 B2
(45) Date of Patent: Sep. 6, 2022

(54) HARVESTING MACHINE WITH CROP DETECTION AND HARVESTING WIDTH DETECTION

(71) Applicant: Kubota Corporation, Osaka (JP)

(72) Inventors: Sotaro Hayashi, Sakai (JP); Mao Kitahara, Sakai (JP); Takashi Nakabayashi, Sakai (JP); Kyosuke Yamaoka, Sakai (JP); Shoma Deguchi, Sakai (JP); Sadanori Hida, Sakai (JP); Kazuhiro Takahara, Sakai (JP); Naoki Saito, Sakai (JP); Masayuki Horiuchi, Sakai (JP)

(73) Assignee: Kubota Corporation, Osaka (JP)

( * ) Notice: Subject to any disclaimer, the term of this patent is extended or adjusted under 35 U.S.C. 154(b) by 355 days.

(21) Appl. No.: 16/618,921

(22) PCT Filed: May 23, 2018

(86) PCT No.: PCT/JP2018/019781
§ 371 (c)(1),
(2) Date: Dec. 3, 2019

(87) PCT Pub. No.: WO2019/003728
PCT Pub. Date: Jan. 3, 2019

(65) Prior Publication Data
US 2020/0084969 A1  Mar. 19, 2020

(30) Foreign Application Priority Data

Jun. 26, 2017 (JP) .............................. JP2017-124236
Jun. 26, 2017 (JP) .............................. JP2017-124237
Dec. 13, 2017 (JP) .............................. JP2017-239075

(51) Int. Cl.
*A01D 57/04* (2006.01)
*A01D 57/20* (2006.01)
*A01D 61/00* (2006.01)

(52) U.S. Cl.
CPC .............. *A01D 57/04* (2013.01); *A01D 57/20* (2013.01); *A01D 61/002* (2013.01)

(58) Field of Classification Search
CPC ...... A01D 57/04; A01D 57/20; A01D 61/002; A01D 41/14; A01D 41/1271; A01D 69/065; A01F 12/10; B60Y 2200/222
See application file for complete search history.

(56) References Cited

U.S. PATENT DOCUMENTS 4,295,323 A * 10/1981 Maier ................ A01D 41/1278
56/10.2 R
4,663,918 A * 5/1987 Williams ........... A01D 41/1278
56/10.2 F (Continued)

FOREIGN PATENT DOCUMENTS

DE         60114121 T2    5/2006
EP         1208734 A1     5/2002
(Continued)

*Primary Examiner* — Arpad Fabian-Kovacs
(74) *Attorney, Agent, or Firm* — The Webb Law Firm

(57) ABSTRACT

A harvesting machine includes a harvesting part provided forward of a machine body, and harvests crops in a farm field; and a plurality of crop sensors provided in the harvesting part at intervals in a left-right direction, and detect the presence of crops upon coming into contact with the crops. The harvesting machine may also include a harvesting width detector that detects a harvesting width corresponding to crops harvested through harvesting work that has actually been performed, included in a workable width within which harvesting work can be performed by the harvesting part; and a travel transmission unit that changes the travel speed of the machine body. The harvesting machine may also (Continued)

include a speed controller that shifts the travel transmission unit to a lower speed as the harvesting width increases, and shifts the travel transmission unit to a higher speed as the harvesting width decreases.

17 Claims, 13 Drawing Sheets

(56) References Cited

U.S. PATENT DOCUMENTS

| | | | | |
|---|---|---|---|---|
| 4,883,964 | A * | 11/1989 | Bohman | A01D 41/1278 250/341.7 |
| 6,073,427 | A * | 6/2000 | Nichols | A01D 41/1271 460/7 |
| 7,431,113 | B2 * | 10/2008 | Deppe | A01D 69/025 180/65.31 |
| 7,716,905 | B2 * | 5/2010 | Wilcox | A01D 41/1278 56/10.2 E |
| 8,010,261 | B2 * | 8/2011 | Brubaker | A01D 41/1278 701/50 |
| 9,232,693 | B2 * | 1/2016 | Hendrickson | G01B 5/0035 |
| 9,322,629 | B2 * | 4/2016 | Sauder | G01B 5/10 |
| 9,565,802 | B2 * | 2/2017 | Schleicher | A01B 69/008 |
| 10,034,423 | B2 * | 7/2018 | Dybro | A01D 41/06 |
| 10,126,282 | B2 * | 11/2018 | Anderson | A01D 41/1271 |
| 11,064,653 | B2 * | 7/2021 | Zielke | H04Q 9/00 |
| 2014/0047810 | A1 | 2/2014 | Peters et al. | |
| 2014/0059988 | A1 * | 3/2014 | Diekhans | A01D 41/1274 56/10.2 A |
| 2014/0144116 | A1 * | 5/2014 | Kraus | A01F 29/14 56/10.2 H |
| 2014/0230391 | A1 * | 8/2014 | Hendrickson | A01D 41/1271 56/10.2 R |
| 2014/0230580 | A1 * | 8/2014 | Dybro | A01D 45/021 73/865 |
| 2014/0236381 | A1 * | 8/2014 | Anderson | A01D 75/00 701/1 |
| 2014/0338298 | A1 * | 11/2014 | Jung | A01D 41/127 56/10.2 R |
| 2015/0293068 | A1 * | 10/2015 | Acheson | G01N 21/84 702/137 |
| 2015/0327440 | A1 * | 11/2015 | Dybro | A01D 45/021 73/862.541 |
| 2016/0029558 | A1 | 2/2016 | Dybro et al. | |
| 2016/0084987 | A1 * | 3/2016 | Dybro | G01P 3/00 702/5 |
| 2016/0330907 | A1 * | 11/2016 | Anderson | A01D 41/127 |
| 2017/0089742 | A1 * | 3/2017 | Bruns | A01D 41/1273 |
| 2017/0339827 | A1 * | 11/2017 | Anderson | A01D 41/06 |
| 2019/0343048 | A1 * | 11/2019 | Farley | A01D 41/127 |

FOREIGN PATENT DOCUMENTS

| | | |
|---|---|---|
| EP | 2520155 A1 | 11/2012 |
| EP | 2574229 A1 | 4/2013 |
| EP | 3000304 A1 | 3/2016 |
| EP | 3092886 A1 | 5/2016 |
| JP | 61124314 A | 6/1986 |
| JP | H553447 B2 | 8/1993 |
| JP | 889061 A | 4/1996 |
| JP | 200178542 A | 3/2001 |
| JP | 2007228837 A | 9/2007 |
| JP | 2010226999 A | 10/2010 |
| JP | 201746642 A | 3/2017 |
| JP | 201768533 A | 4/2017 |
| RU | 2603585 C2 | 3/2014 |

* cited by examiner

Fig.5

| B1 | 22(ON) || 23(ON) ||
|---|---|---|---|---|
|  | 31(ON) | 32(ON) | 33(ON) | 34(ON) |

|←―A1―→|←―A2―→|←―A3―→|←―A4―→|
|←―――――――W1―――――――→|

| B2 | 22(ON) || 23(ON/OFF) ||
|---|---|---|---|---|
|  | 31(ON) | 32(ON) | 33(ON) | 34(OFF) |

|←―A1―→|←―A2―→|←―A3―→|←―A4―→|
|←―――――W1―――――→|

| B3 | 22(ON) || 23(ON) ||
|---|---|---|---|---|
|  | 31(OFF) | 32(ON) | 33(ON) | 34(ON) |

|←―A1―→|←―A2―→|←―A3―→|←―A4―→|
|←―――――W1―――――→|

| B4 | 22(ON) || 23(ON/OFF) ||
|---|---|---|---|---|
|  | 31(ON) | 32(ON) | 33(OFF) | 34(OFF) |

|←―A1―→|←―A2―→|←―A3―→|←―A4―→|
|←―――W1―――→|

| B5 | 22(ON) || 23(ON/OFF) ||
|---|---|---|---|---|
|  | 31(OFF) | 32(ON) | 33(ON) | 34(OFF) |

|←―A1―→|←―A2―→|←―A3―→|←―A4―→|
|←―――W1―――→|

| B6 | 22(ON/OFF) || 23(ON) ||
|---|---|---|---|---|
|  | 31(OFF) | 32(OFF) | 33(ON) | 34(ON) |

|←―A1―→|←―A2―→|←―A3―→|←―A4―→|
|←―――W1―――→|

| B7 | 22(ON) | | 23(ON/OFF) | |
|---|---|---|---|---|
| | 31(OFF) | 32(ON) | 33(OFF) | 34(OFF) |
| | ←—A1—→ | ←—A2—→ | ←—A3—→ | ←—A4—→ |
| | | ←—W1—→ | | |

| B8 | 22(ON/OFF) | | 23(ON/OFF) | |
|---|---|---|---|---|
| | 31(OFF) | 32(OFF) | 33(ON) | 34(OFF) |
| | ←—A1—→ | ←—A2—→ | ←—A3—→ | ←—A4—→ |
| | | | ←—W1—→ | |

| B9 | 22(ON/OFF) | | 23(ON) | |
|---|---|---|---|---|
| | 31(OFF) | 32(OFF) | 33(OFF) | 34(ON) |
| | ←—A1—→ | ←—A2—→ | ←—A3—→ | ←—A4—→ |
| | | | | ←—W1—→ |

Fig.11
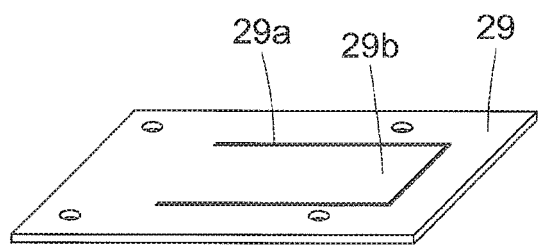
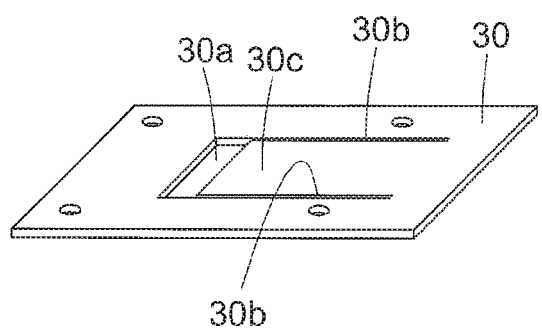

Fig.14
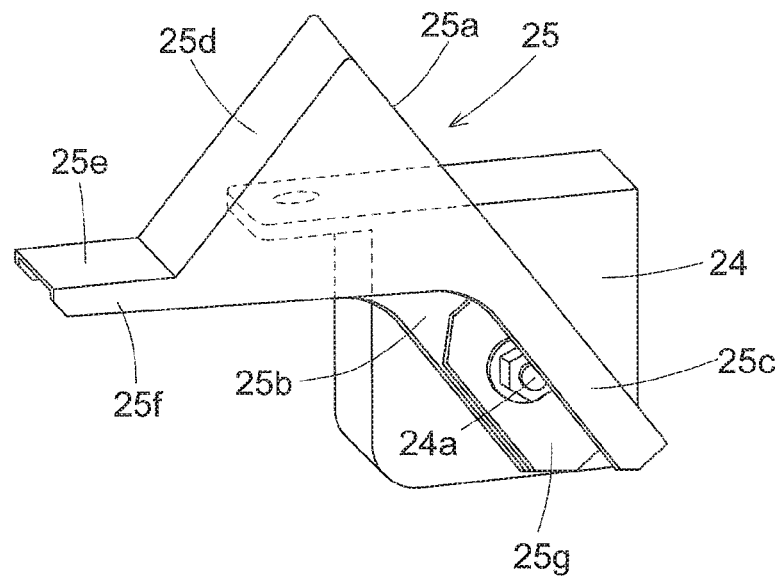
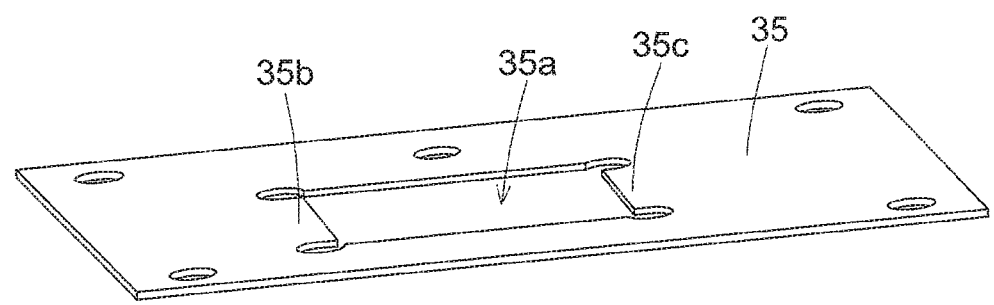
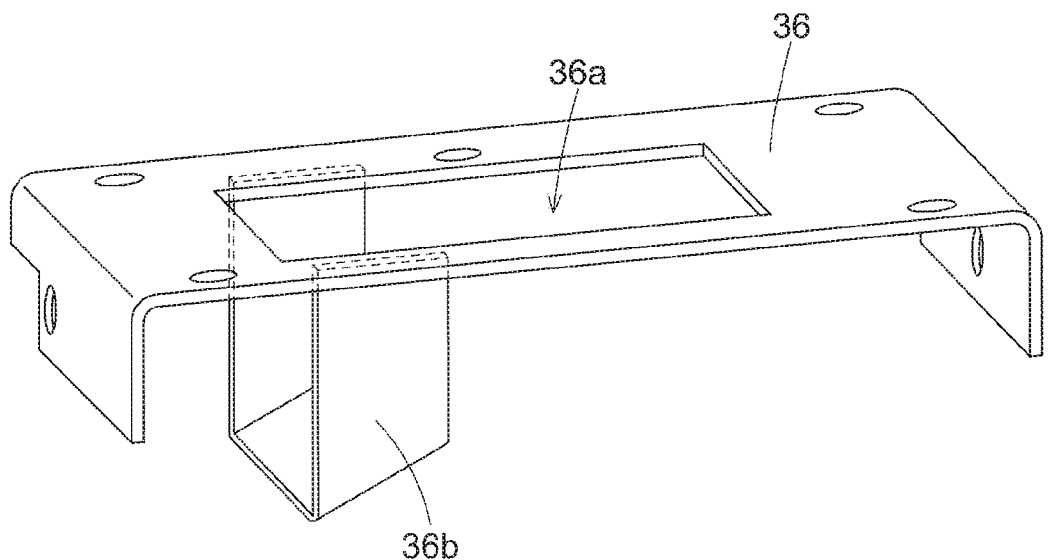

| B11 | 31(ON) | 22(ON) | 23(ON) | 32(ON) |
|---|---|---|---|---|
| | ←—A1—→ | ←——A2——→ | | ←—A3—→ |
| | ←——————————W1——————————→ | | | |

| B12 | 31(ON) | 22(ON) | 23(ON/OFF) | 32(OFF) |
|---|---|---|---|---|
| | ←—A1—→ | ←——A2——→ | | ←—A3—→ |
| | ←————————W1————————→ | | | |
| | ←—W1—→ | | | |

| B13 | 31(OFF) | 22(ON/OFF) | 23(ON) | 32(ON) |
|---|---|---|---|---|
| | ←—A1—→ | ←——A2——→ | | ←—A3—→ |
| | | ←————————W1————————→ | | |
| | | | | ←—W1—→ |

| B14 | 31(OFF) | 22(ON) | 23(ON) | 32(OFF) |
|---|---|---|---|---|
| | ←—A1—→ | ←——A2——→ | | ←—A3—→ |
| | | ←————————W1————————→ | | |

HARVESTING MACHINE WITH CROP DETECTION AND HARVESTING WIDTH DETECTION

CROSS-REFERENCE TO RELATED APPLICATIONS

This application is the United States national phase of International Application No. PCT/JP2018/019781 filed May 23, 2018, and claims priority to Japanese Patent Application Nos. 2017-124236 and 2017-124237 filed Jun. 26, 2017, and No. 2017-239075 filed Dec. 13, 2017, the disclosures of which are hereby incorporated by reference in their entirety.

TECHNICAL FIELD

The present invention relates to a harvesting machine that harvests planted stalks.

BACKGROUND ART

In the case of a normal combine, which is an example of a harvesting machine, stalks in a farm field are reaped by a reaping part (corresponding to a harvesting part), and the reaped stalks are provided from the reaping part to a conveying part, and are provided by the conveying part to a threshing apparatus in a machine body.

Regarding a normal combine described above, Patent Document 1 discloses that the conveying part is coupled to a rear portion of the reaping part, and stalk sensors that detect the presence of stalks are provided on the right and left of the entrance of the conveying part.

With this configuration, if the stalk sensor on the right side enters a detection state, it can be determined that stalks reaped from the right side of the reaping part are being supplied to the entrance of the conveying part. If the stalk sensor on the left side enters a detection state, it can be determined that stalks reaped from the left side of the reaping part are being supplied to the entrance of the conveying part.

Also, for example, for rice farming, a farm field management system has been proposed that aims to improve harvesting by combing various kinds of farm field work data, collected by a rice transplanter (or a seeding machine), a tractor, and a combine, with a GPS function.

According to Patent Document 2 disclosed as the above-described farm field management system, one farm field is divided into a large number of small areas, and farm field work data, such as data regarding seedling planting (seeding) performed by a rice transplanter (a seeding machine), data regarding cultivation performed by a tractor, and data regarding harvesting performed by a combine (the yield and taste of crops), is collected and accumulated in correspondence with each area of the farm field, and thus seedling planting (seeding) performed by a rice transplanter (a seeding machine), cultivation performed by a tractor, and so on are improved for the next year.

PRIOR ART DOCUMENTS

Patent Documents

Patent Document 1: JP 2017-46642A (see paragraphs 0012 and 0051)
Patent Document 2: JP 2017-68533A

SUMMARY OF THE INVENTION

Problems to be Solved by the Invention

The present invention aims to improve performance in various kinds of work.

Specifically, as disclosed in Patent Document 1, for cases in which the state of harvesting performed by the harvesting part is detected, effective use of the detected state of harvesting performed by the harvesting part is starting to be proposed.

One objective of the present invention is, for cases in which the state of harvesting performed by a harvesting part is detected by a harvesting machine, to effectively use the detected state of harvesting performed by the harvesting part.

Also, in order to improve the performance of the above-described farm field management system, it is necessary to improve the accuracy of data regarding farm field work that is performed by a rice transplanter (a seeding machine), a tractor, and a combine.

The present invention focuses on a harvesting machine such as a combine in a farm field management system, and one objective of the present invention is to improve the accuracy of data regarding farm field work that is performed by the harvesting machine.

Means for Solving Problems

A harvesting machine according to one embodiment of the present invention includes:

a harvesting part that is provided forward of a machine body, and harvests crops in a farm field; and a plurality of crop sensors that are provided in the harvesting part at intervals in a left-right direction, and detect the presence of crops upon coming into contact with the crops.

A harvesting part provided forward of the machine body of a harvesting machine has a large width (a width in a left-right direction). Therefore, if a plurality of crop sensors are provided in the harvesting part as in the present invention, it is possible to detect a harvesting width corresponding to crops harvested through harvesting work that has actually been performed, included in a workable width within which harvesting work can be performed by the harvesting part, based on which crop sensor detects crops.

For example, if the harvesting width is large, it can be determined that the amount of crops guided to the harvesting part is large, and if the harvesting width is small, it can be determined that the amount of crops guided to the harvesting part is small.

According to the present invention, it is possible to detect an area to which crops are guided, within the width of the harvesting part, based on which crop sensor detects crops. For example, it is possible to detect a state in which crops are guided to a right area of the harvesting part, a state in which crops are guided to a left area of the harvesting part, and a state in which crops are guided to a center area of the harvesting part in a left-right direction, and so on.

Thus, it is possible to improve the accuracy of farm field work data regarding the harvesting machine by detecting the harvesting width, the area of the harvesting part to which crops are guided, and so on, and considering these pieces of detection data in addition to the farm field work data.

In the present invention, it is preferable that a conveying part that conveys crops from the harvesting part toward the machine body is coupled to a rear portion of the harvesting part, and the harvesting part includes:

a lateral conveying member that is driven to rotate about an axis that extends in a left-right direction so as to convey crops toward an entrance of the conveying part in a left-right direction of the harvesting part; and a frame member that supports the lateral conveying member so as to be rotatable, and to which the conveying part is coupled, and the crop sensors are provided on the frame member.

There is a case in which, in a harvesting machine, a conveying part is coupled to a rear portion of the harvesting part, crops in a farm field are harvested and collected by the harvesting part, and the crops are conveyed from the conveying part toward the machine body. In such a case, the harvesting part may be provided with a frame member and a lateral conveying member, and in such a harvesting machine, crops that have been harvested are conveyed by the lateral conveying member of the harvesting part in a left-right direction, are collected to an entrance of the conveying part, and are conveyed by the conveying part toward the machine body.

The harvested crops come into contact with the lateral conveying member of the harvesting part and are conveyed, and at the same time, the crops come into contact with the frame member of the harvesting part. Therefore, by providing the crop sensors on the frame member of the harvesting part, it is possible to improve reliability in detection of crops performed by the crop sensors.

According to the present invention, the crop sensors are provided on the frame member of the harvesting part, which is an existing structure, and therefore the present invention is advantageous in terms of simplification of the structure for supporting the crop sensors.

In the present invention, it is preferable that the crop sensors are provided on a portion that is located below the lateral conveying member, of the frame member.

Crops that have been harvested are likely to come into contact with a lower portion of the frame member of the harvesting part. Therefore, by providing a crop sensor on a portion that is located below the lateral conveying member, of the frame member, it is possible to further improve reliability in detection of crops performed by the crop sensors.

In the present invention, it is preferable that the crop sensors are provided on a bottom portion of the frame member.

In a state in which crops that have been harvested are likely to come into contact with a lower portion of the frame member of the harvesting part, by providing a crop sensor on a bottom portion of the frame member of the harvesting part, it is possible to further improve reliability in detection of crops performed by the crop sensors.

In the present invention, it is preferable that the crop sensors are located outside a trajectory of rotation of the lateral conveying member.

According to the present invention, the lateral conveying member of the harvesting part does not interfere with the crop sensors when being driven to rotate. Therefore, it is possible to prevent the crop sensors and the lateral conveying member of the harvesting part from being damaged, without difficulty.

In the present invention, it is preferable that openings are formed in the frame member, and detectors of the crop sensors are provided so as to respectively protrude from the openings, and are configured to swing upon coming into contact with crops.

Some contact type sensors include a body and a detector that is supported by the body so as to be swingable.

According to the present invention, the detector of each crop sensor protrudes from an opening in the frame member, and crops are detected by the detector of each crop sensor. Therefore, the body of each crop sensor can be protected by the frame member, and the present invention is advantageous in terms of the durability of the crop sensors.

In the present invention, it is preferable that gap filling members are provided, each gap filling member filling a gap between the detector and the opening corresponding thereto.

According to the present invention, when the detector of a crop sensor swings in a state in which the detector protrudes from an opening in the frame member, the gap between the detector of the crop sensor and the opening in the frame member is filled by a gap filling member. Therefore, it is possible to avoid a situation in which crops pass through the aforementioned gap and fall out.

In the present invention, it is preferable that a wall portion that extends downward is provided on an outer periphery of a portion of each detector, the portion protruding from the opening corresponding thereto, and the portion of each detector protruding from the opening corresponding thereto has a box shape due to the wall portion.

According to the present invention, by forming a portion of the detector of each crop sensor protruding from an opening so as to have a box shape, it is possible to improve the strength of the detector of each crop sensor.

According to the present invention, in a case in which the detector of a crop sensor protrudes from an opening in the frame member, even if a gap is formed between the detector of the crop sensor and the opening in the frame member, the gap is narrow due to the wall portion. Thus, it is possible to avoid a situation in which crops pass through the aforementioned gap and fall out.

In the present invention, it is preferable that the detector includes an upper stopper that determines an upper swing limit of the detector by abutting against the frame member, and a lower stopper that determines a lower swing limit of the detector by abutting against the frame member.

According to the present invention, when crops that have been guided to the harvesting part come into contact with a detector of the crop sensor, even if the crops cause the detector of the crop sensor to swing upward or downward more than required, the detector of the crop sensor will be stopped by the upper and lower stoppers, at the upper and lower swing limits. Therefore, it is possible to prevent the crop sensor from being damaged due to an unnecessarily large swing.

In the present invention, it is preferable that a conveying part that conveys crops from the harvesting part toward the machine body is coupled to a rear portion of the harvesting part, and the crop sensors are provided in the harvesting part so as to be distributed on a right side and a left side of a center of an entrance of the conveying part in a left-right direction.

There is a case in which, in a harvesting machine, a conveying part is coupled to a rear portion of the harvesting part, crops in a farm field are harvested and collected by the harvesting part, and the crops are conveyed from the conveying part toward the machine body.

According to the present invention, in the harvesting part, the crop sensors are provided on the right side and the left side of the center of the entrance of the conveying part in the left-right direction, and the crop sensors are provided in a wide range in the left-right direction of the harvesting part. Therefore, it is possible to appropriately detect, for example, the harvesting width, and the area to which crops are guided.

In the present invention, it is preferable that the crop sensors are provided in the harvesting part at a position on the right side of the entrance, a position on the left side of the entrance, and a position that is forward of the entrance.

According to the present invention, in the harvesting part, a crop sensor is provided at a position that is forward of the entrance of the conveying part in addition to positions on the right side and the left side of the entrance of the conveying part, and thus the crop sensors are provided in a wide range in the harvesting part in the left-right direction. Therefore, it is possible to appropriately detect, for example, the harvesting width, and the area to which crops are guided.

In the present invention, it is preferable that the crop sensor that is provided in the harvesting part at the position that is forward of the entrance is located forward of the crop sensors that are provided in the harvesting part at the positions on the right side and the left side of the entrance.

In a case in which crops that have been harvested are conveyed in a left-right direction by the lateral conveying member of the harvesting part, are collected to the entrance of the conveying part, and are conveyed toward the machine body by the conveying part, the crops will concentrate in an area that is forward of the entrance of the conveying part.

According to the present invention, the crop sensor provided forward of the entrance of the guiding part is located slightly away from an area that is forward of the entrance of the conveying part, in a forward direction.

As a result, even if crops concentrate in an area that is forward of the entrance of the conveying part, there is no possibility that the retention of crops or the clogging of crops occur due to the crop sensors. Crops will be smoothly collected to the entrance of the conveying part and conveyed toward the machine body by the conveying part.

In the present invention, it is preferable that the crop sensors that are provided in the harvesting part at the positions on the right side and the left side of the entrance each include a detector that swings about an axis that extends in a front-rear direction, upon coming into contact with crops.

Some crop sensors are provided with a detector that is to be brought into contact with crops. The detector swings upon coming into contact with crops, and thus detects the presence of crops.

According to the present invention, in a case in which crops that have been harvested are conveyed by the lateral conveying member of the harvesting part in a left-right direction, the detectors of the crop sensors provided on the right side and the left side of the entrance of the conveying part each swing in a left-right direction about an axis that extends in a front-rear direction.

Thus, the detectors of the crop sensors swing along with the flow of the conveyance of crops, and the detectors of the crop sensors do not interfere with the conveyance of crops. Therefore, there is no possibility that the retention of crops or the clogging of crops occur due to the crop sensors.

In the present invention, it is preferable that the crop sensor that is provided in the harvesting part at the position that is forward of the entrance includes a detector that swings about an axis that extends in a left-right direction, upon coming into contact with crops.

Crops that have been harvested in an area that is forward of the conveying part of the harvesting part are directly conveyed rearward and reach the entrance of the conveying part.

According to the present invention, the detector of the crop sensor provided forward of the entrance of the conveying part swings in a front-rear direction about an axis that extends in a left-right direction.

Thus, the detector of the crop sensor swings along with the flow of the conveyance of crops, and the detector of the crop sensor does not interfere with the conveyance of crops. Therefore, there is no possibility that the retention of crops or the clogging of crops occur due to the crop sensor.

A harvesting machine according to one embodiment of the present invention includes:

a harvesting part that is provided forward of a machine body, and harvests crops in a farm field;

a harvesting width detector that detects a harvesting width corresponding to crops harvested through harvesting work that has actually been performed, included in a workable width within which harvesting work can be performed by the harvesting part;

a travel transmission unit that changes the travel speed of the machine body; and a speed controller that shifts the travel transmission unit to a lower speed as the harvesting width increases, and shifts the travel transmission unit to a higher speed as the harvesting width decreases, based on the result of detection performed by the harvesting width detector.

In a case in which a harvesting width detector according to the present invention is provided, if the harvesting width is large, it can be determined that the amount of crops that will be guided to the harvesting part is large, and it can be determined that a large load will be applied to the processing apparatus that processes the harvested crops, the engine, and so on.

In contrast, if the harvesting width is small, it can be determined that the amount of crops that will be guided to the harvesting part is small, and it can be determined that the load that will be applied to the processing apparatus, the engine, and so on will be small.

According to the present invention, the travel speed of the machine body is automatically changed to a lower speed as the harvesting width increases, and thus an increase in the amount of crops that is guided to the harvesting part is suppressed and an increase in the load that is applied to the processing apparatus, the engine, and so on is suppressed, so that harvesting work can be stably performed.

The travel speed of the machine body is automatically changed to a higher speed as the harvesting width decreases, and thus a decrease in the amount of crops that is guided to the harvesting part is suppressed, and the processing apparatus, the engine, and so on work efficiently.

As described above, according to the present invention, the travel speed of the machine body is automatically changed based on the result of detection of the harvesting width. Therefore, it is possible to enable the processing apparatus, the engine, and so on to work efficiently, while suppressing an increase in the load, and it is possible to improve the work performance of the harvesting machine.

In the present invention, it is preferable that crop sensors that detect the presence of crops upon coming into contact with the crops are included in the harvesting width detector, and two or more crop sensors are provided in the harvesting part at intervals in a left-right direction.

According to the present invention, in a case in which the harvesting width is to be detected by the harvesting width detector, it is possible to directly detect crops that are guided to the harvesting part because the crop sensors that detect the presence of crops upon coming into contact with the crops are provided in the harvesting part. Therefore, it is possible to improve accuracy in detection of the harvesting width.

According to the present invention, two or more crop sensors are provided in the harvesting part at intervals in a left-right direction. Therefore, it is possible to efficiently detect the presence or absence of crops in a range that spans between a right portion and a left portion of the harvesting part, using the crop sensors.

In the present invention, it is preferable that the harvesting machine further includes a conveying part that is coupled to a rear portion of the harvesting part, and conveys crops that have been harvested, from the harvesting part toward the machine body, and harvest crop sensors that detect the presence of crops upon coming into contact with the crops that have been harvested are provided at an entrance of the conveying part.

There is a case in which, in a harvesting machine, a conveying part is coupled to a rear portion of the harvesting part, crops in a farm field are harvested and collected by the harvesting part, and the crops are conveyed from the conveying part toward the machine body.

According to the present invention, the harvest crop sensors are provided at the entrance of the conveying part in addition to the harvesting width detector. Therefore, for example, if the harvest crop sensors do not detect crops even though the harvesting width detector has detected crops, it can be determined that an abnormality has occurred in the harvesting width detector or a harvest crop sensor, for example. In this way, using the harvest crop sensors provided at the entrance of the conveying part in addition to the harvesting width detector, it is possible to detect an abnormality.

In the present invention, it is preferable that the harvest crop sensors are provided on the right side and the left side of the entrance of the conveying part.

If a harvesting machine is provided with the above-described conveying part, crops that have been guided from the farm field to a right portion of the harvesting part often pass through the right portion of the harvesting part and an area on the right side of the entrance of the conveying part, and crops that have been guided from the farm field to a left portion of the harvesting part often pass through the left portion of the harvesting part and an area on the left side of the entrance of the conveying part.

According to the present invention, the harvest crop sensors are provided at the left side and the right side of the entrance of the conveying part. Therefore, for example, if the right harvest crop sensor does not detect crops even though the harvesting width detector has detected crops in a right area of the harvesting part, it can be determined that an abnormality has occurred in the harvesting width detector or a harvest crop sensor, for example. In this way, using the harvest crop sensors provided on the right side and the left side of the entrance of the conveying part in addition to the harvesting width detector, it is possible to detect various kinds of abnormalities.

In the present invention, it is preferable that crop sensors that detect the presence of crops upon coming into contact with the crops are included in the harvesting width detector, three or more crop sensors are provided in the harvesting part at intervals in a left-right direction, and at least one crop sensor that is located on a center side, of the crop sensors, is located forward of the entrance of the harvesting part.

According to the present invention, in the harvesting part, crop sensors are provided at a position that is forward of the entrance of the conveying part in addition to positions on the right side and the left side of the entrance of the conveying part, and thus the crop sensors are provided in a wide range in the harvesting part in the left-right direction. Therefore, it is possible to efficiently detect the presence or absence of crops in a range that spans between a right portion and a left portion of the harvesting part, using the crop sensors.

BRIEF DESCRIPTION OF THE DRAWINGS

FIG. 5 is a diagram showing patterns of stalk detection that is performed by the crop sensors.

FIG. 11 is a perspective view of a gap filling member according to the third variation of the first embodiment.

FIG. 14 is an exploded perspective view of an area around a crop sensor according to the fourth variation of the first embodiment.

DESCRIPTION OF EMBODIMENTS

FIGS. 1 to 18 show a normal combine for rice, which is an example of a harvesting machine.

In FIGS. 1 to 18, F indicates a "forward direction" of a machine body 1, B indicates a "rearward direction" of the machine body 1, U indicates an "upward direction" of the machine body 1, and D indicates a "downward direction" of the machine body 1. R indicates a "rightward direction" of the machine body 1, and L indicates a "leftward direction" of the machine body 1.

Overall Configuration of Combine

Figure 1:
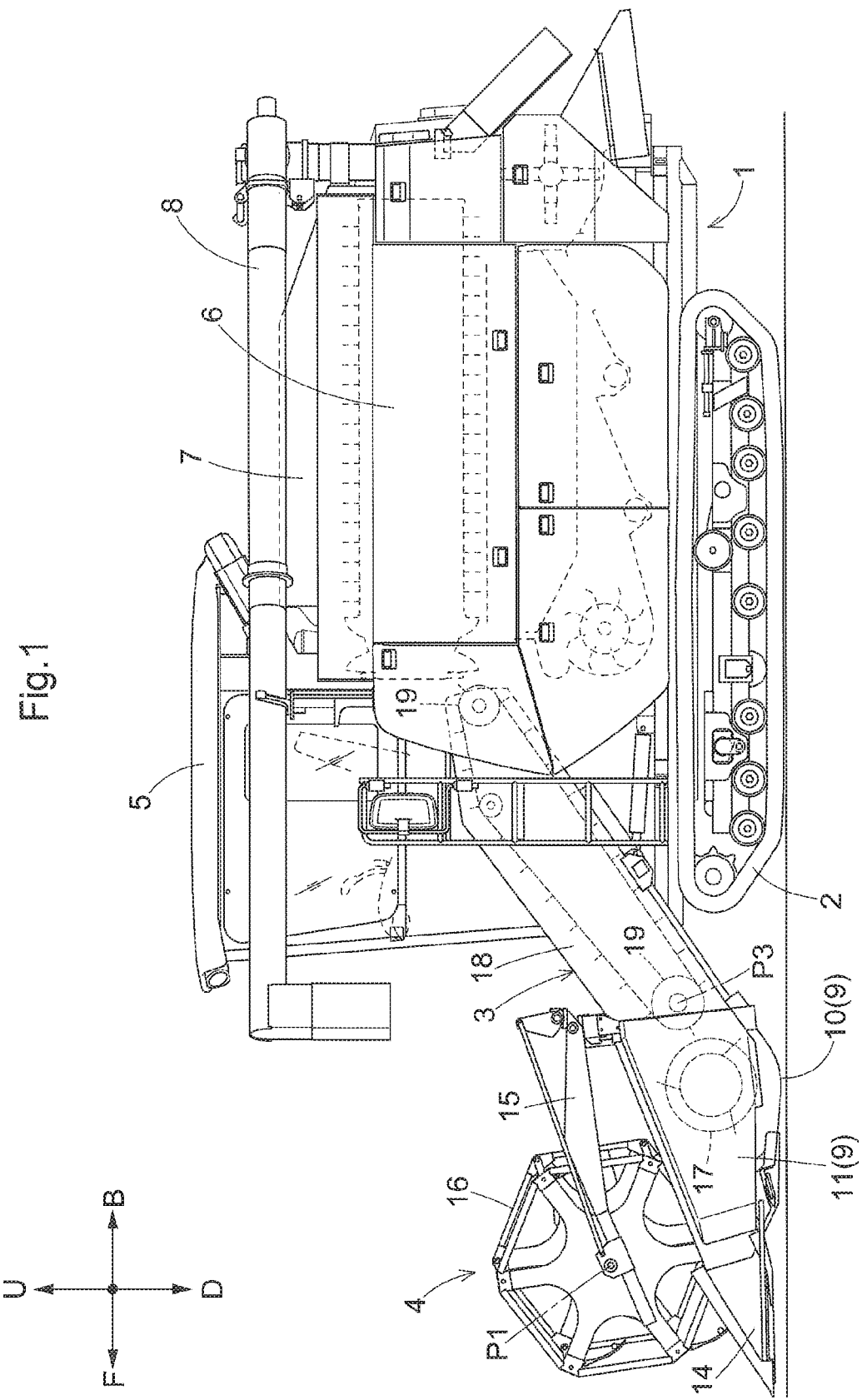
FIG. 1 is an overall side view of a combine.

As shown in FIG. 1, the machine body 1, which is a machine body frame, is supported by right and left crawler type travelling apparatuses 2, and a conveying part 3 is supported on a front portion of the machine body 1 so as to be able to swing upward and downward. A reaping part 4 (corresponding to a harvesting part) is provided, and the conveying part 3 is coupled to a rear portion of the reaping part 4.

As shown in FIG. 1, a drive cabin 5 that houses a driver part is supported on the right side of a front portion of the machine body 1, a threshing apparatus 6 is supported on the left side of the machine body 1, and a grain tank 7 and a grain discharging apparatus 8 are supported on the right side of the machine body 1.

As shown in FIG. 1, as the machine body 1 travels forward, stalks (corresponding to crops) in a farm field are reaped by the reaping part 4, and stalks thus reaped are supplied from the reaping part 4 to the threshing apparatus 6 via the conveying part 3. The stalks are subjected to threshing processing in the threshing apparatus 6. Grains that have been collected are supplied to the grain tank 7, and straw is discharged from a rear portion of the threshing apparatus 6. When the grain tank 7 becomes full of grains, the grains in the grain tank 7 are discharged to another transport vehicle (not shown) or the like by the grain discharging apparatus 8.

Control Functions of Combine

This combine is provided with a position detection system (not shown) that detects the position of the machine body 1 and the orientation of the machine body 1, and a yield amount sensor (not shown) that detects the amount of grain collected by the threshing apparatus 6.

The position detection system is a global navigation satellite system (GNSS), which is typically a global positioning system (GPS). The yield amount sensor continuously detects the weight of grain collected per unit time.

In addition to the above-described position detection system and yield amount sensor, the combine is provided with the function of using crop sensors 31, 32, 33, and 34 (see FIG. 2) to detect a reaping width W1 (a harvesting width) (see FIGS. 5 and 6) corresponding to stalks reaped through reaping work that has actually been performed, included in a workable width within which reaping work can be performed by the reaping part 4.

With this configuration, when one farm field is divided into a large number of small areas, the detection value of the yield amount sensor of each area of the farm field and the reaping width W1 of each area of the farm field can be collected and accumulated.

Configuration of Reaping Part

Figure 2:
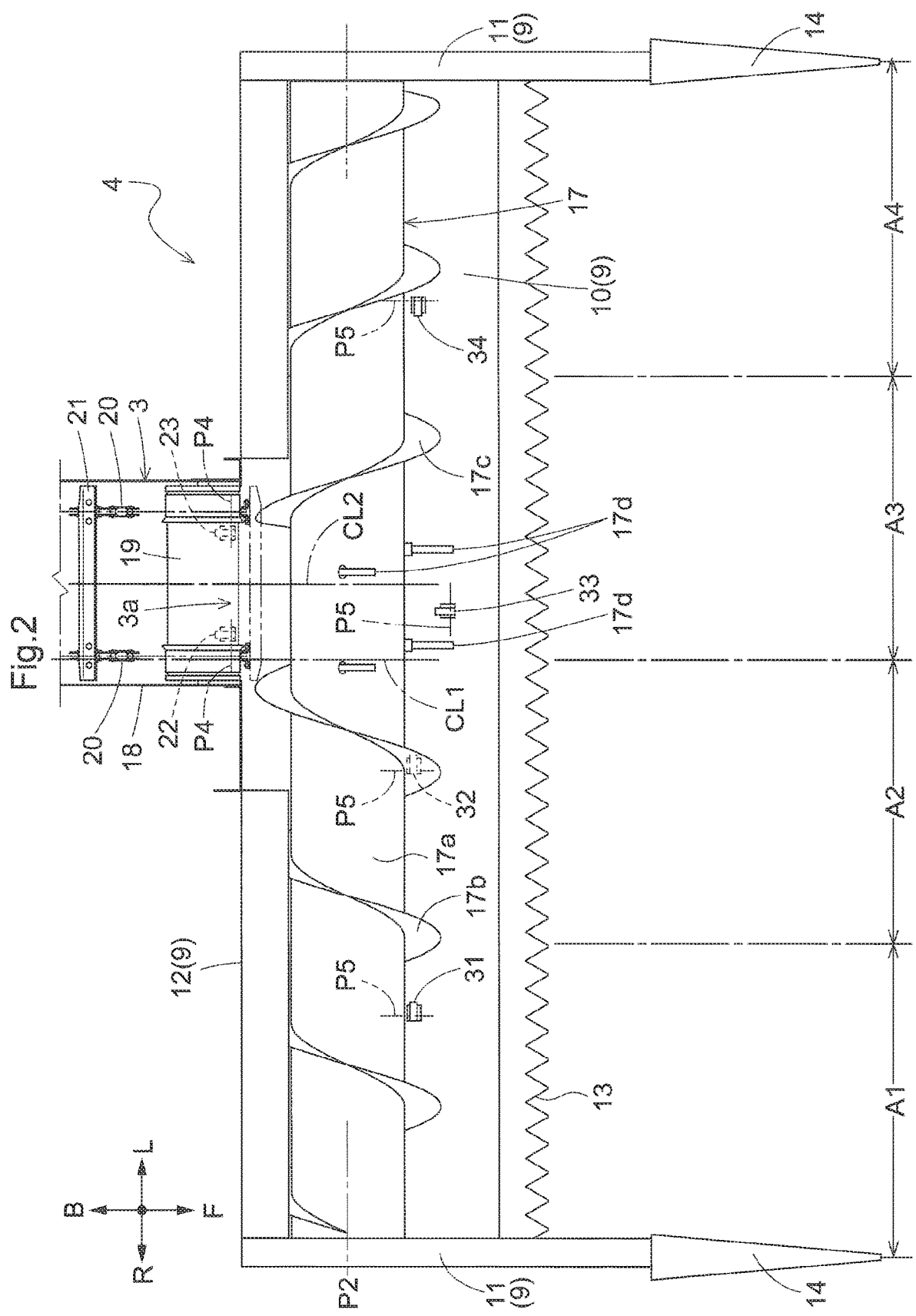
FIG. 2 is a lateral plan view of a reaping part and a conveying part.
Figure 3:
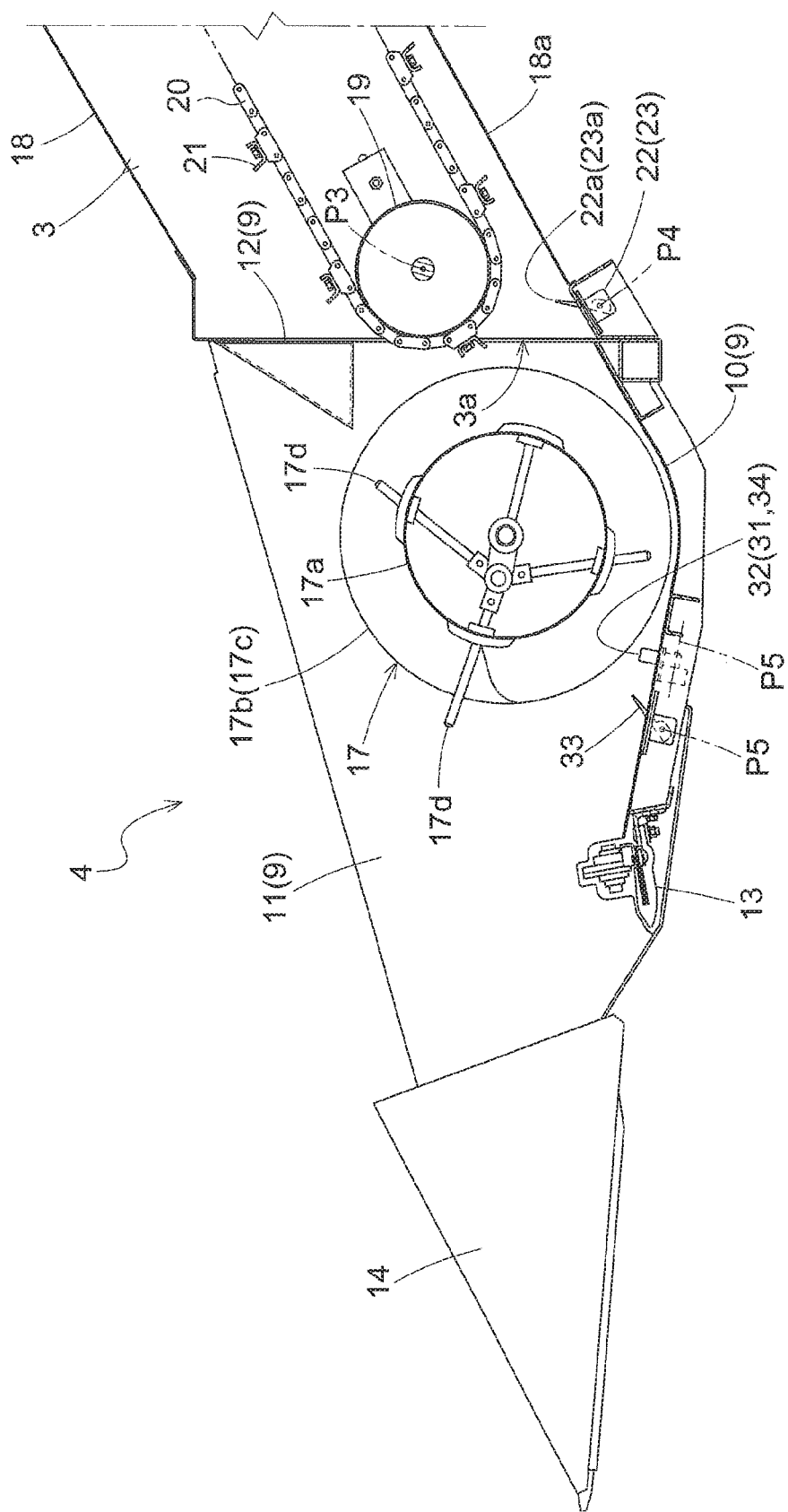
FIG. 3 is a vertical side view of the reaping part and the conveying part.

As shown in FIGS. 1, 2, and 3, the reaping part 4 is provided with a frame member 9, which is a framework. The frame member 9 includes a bottom portion 10, lateral side portions 11 that are coupled to right and left portions of the bottom portion 10, and a rear-side portion 12 that is coupled to rear portions of the bottom portion 10 and the lateral side portions 11.

As shown in FIGS. 2 and 3, a front portion (an entrance 3a) of the conveying part 3 is coupled to the rear-side portion 12, and the conveying part 3 is coupled to a rear portion of the reaping part 4. The conveying part 3 is coupled to the rear portion of the reaping part 4 in an offset manner such that a center CL2 of the entrance 3a of the conveying part 3 in the left-right direction is located on the left side of a center CL1 of the reaping part 4 in the left-right direction.

As shown in FIGS. 2 and 3, a clipper type cutting apparatus 13 is supported on a front portion of the bottom portion 10 in a left-right direction, and dividers 14 are coupled to front portions of the lateral side portions 11. As shown in FIG. 1, right and left arms 15 that are supported on a rear portion of the frame member 9 extend forward, and a reel 16 is supported around an axis P1 of front portions of the arms 15, which extends in a left-right direction, so as to be rotatable.

As shown in FIGS. 1, 2, and 3, a lateral conveying member 17 is supported by the lateral side portions 11 of the frame member 9 so as to be rotatable about an axis P2 that extends in a left-right direction. The lateral conveying member 17 includes a body 17a that is cylindrical, a right spiral portion 17b and a left spiral portion 17c that are coupled to an outer circumferential surface of the body 17a, and raking portions 17d that are rod-shaped.

As shown in FIG. 2, the right spiral portion 17b of the lateral conveying member 17 is located on the right side of the entrance 3a of the conveying part 3, and the left spiral portion 17c of the lateral conveying member 17 is located on the left side of the entrance 3a of the conveying part 3. The raking portions 17d of the lateral conveying member 17 are located on the front side of the entrance 3a of the conveying part 3.

As shown in FIGS. 1, 2, and 3, as the machine body 1 travels forward, stalks between the right and left dividers 14 are raked by the reel 16 toward the lateral conveying member 17, while the bases of the stalks are cut by the cutting apparatus 13, and the reaped stalks are guided to a gap between the lateral conveying member 17 and the bottom portion 10 due to rotation of the lateral conveying member 17.

As shown in FIG. 2, stalks that have been guided to an area near the right spiral portion 17b of the lateral conveying member 17 are conveyed to the left side by the right spiral portion 17b of the lateral conveying member 17, and are supplied to the entrance 3a of the conveying part 3 by the raking portions 17d of the lateral conveying member 17.

Stalks that have been guided to an area near the left spiral portion 17c of the lateral conveying member 17 are conveyed to the right side by the left spiral portion 17c of the lateral conveying member 17, and are supplied to the entrance 3a of the conveying part 3 by the raking portions 17d of the lateral conveying member 17.

Stalks that have been guided to an area near the raking portions 17d of the lateral conveying member 17 are conveyed to the rear side by the raking portions 17d of the lateral conveying member 17, and are supplied to the entrance 3a of the conveying part 3.

Configuration of Conveying Part

As shown in FIGS. 1, 2, and 3, the conveying part 3 is provided with a supporting case 18 that has a square tube shape and is supported on a front portion of the machine body 1 so as to be swingable upward and downward. A front portion of the supporting case 18 is coupled to the rear-side portion 12 of the reaping part 4.

As shown in FIGS. 1, 2, and 3, in the supporting case 18, the conveying part 3 includes a rotating body 19 that is driven to rotate about an axis P3 that extends in a left-right direction, right and left conveying chains 20, and a conveying member 21 that is attached so as to span between the conveying chains 20.

As shown in FIGS. 2 and 3, as a result of the rotating body 19 being driven to rotate, the conveying member 21 moves toward the threshing apparatus 6 along a bottom portion 18a of the supporting case 18.

As described in the previous section "Configuration of Reaping Part", when stalks are supplied from the reaping part 4 to the entrance 3a of the conveying part 3, the stalks are conveyed by the conveying member 21 along the bottom portion 18a of the supporting case 18, and are supplied to the threshing apparatus 6.

As shown in FIGS. 2 and 3, right and left harvest crop sensors 22 and 23 are provided on the right side and the left side of the entrance 3a of the conveying part 3.

The harvest crop sensors 22 and 23 include detectors 22a and 23a that are arm-shaped and are swingable forward and rearward about an axis P4 that extends in a left-right direction. In plan view, the harvest crop sensors 22 and 23 are located on the sides of the center CL2 of the entrance 3a of the conveying part 3 in the left-right direction relative to the conveying chains 20, and, in a side view, the harvest crop sensors 22 and 23 are located on the front side of the rotating body 19 so as not to interfere with the trajectory of rotation of the conveying member 21.

As shown in FIGS. 2 and 3, stalks are supplied from the reaping part 4 to the entrance 3a of the conveying part 3, and come into contact with the detectors 22a and 23a of the harvest crop sensors 22 and 23. Thus, the harvest crop sensors 22 and 23 detect the presence of stalks Arrangement of Crop Sensors in Reaping Part As described in the previous section "Configuration of Reaping Part", four crop sensors 31, 32, 33, and 34 that detect the presence of stalks by coming into contact with reaped stalks, in a state in which stalks between the right and left dividers 14 are reaped and guided to the reaping part 4, are provided in the reaping part 4 as described below.

Using the crop sensors 31 to 34, it is possible to detect the reaping width W1 (the harvesting width) (see FIGS. 5 and 6) corresponding to stalks reaped through reaping work that has actually been performed, included in the workable width within which reaping work can be performed by the reaping part 4 (see "Patterns of Stalk Detection Performed by Crop Sensors" below).

As shown in FIGS. 2 and 3, crop sensors 31 and 32 are provided on the bottom portion 10 of the frame member 9 at positions that are forward of the right spiral portion 17b of the lateral conveying member 17 (corresponding to positions on the right side of the entrance 3a of the conveying part 3 in the reaping part 4 (the harvesting part)).

The crop sensor 34 is provided at a position that is forward of the left spiral portion 17c of the lateral conveying member 17 (corresponding to a position on the left side of the entrance 3a of the conveying part 3 in the reaping part 4 (the harvesting part)).

The crop sensor 33 is provided at a position that is forward of the raking portions 17d of the lateral conveying member 17 (corresponding to a position that is forward of the entrance 3a of the conveying part 3 in the reaping part 4 (the harvesting part)).

As a result, as shown in FIGS. 2 and 3, the crop sensors 31 to 34 are provided in the reaping part 4 (the harvesting part) at intervals in a left-right direction, and are distributed on the right side and the left side of the center CL2 of the entrance 3a of the conveying part 3 in the left-right direction in the reaping part 4 (the harvesting part), and are provided on the frame member 9 at positions below the lateral conveying member 17.

As shown in FIG. 2, the crop sensors 31 and 32 overlap the trajectory of rotation of the right spiral portion 17b of the lateral conveying member 17 in plan view, and the crop sensor 34 overlaps the trajectory of rotation of the left spiral portion 17c of the lateral conveying member 17 in plan view.

As shown in FIG. 3, the crop sensors 31, 32, and 34 are located forward (outside) of the trajectories of rotation of the right spiral portion 17b and the left spiral portion 17c of the lateral conveying member 17 in a side view, and the crop sensors 31, 32, and 34 do not interfere with the right spiral portion 17b and the left spiral portion 17c of the lateral conveying member 17.

As shown in FIG. 2, the positions of the crop sensors 31, 32, and 34 and the positions of the raking portions 17d of the lateral conveying member 17 are different from each other in the left-right direction. Therefore, the crop sensors 31, 32, and 34 do not interfere with the raking portions 17d of the lateral conveying member 17.

As shown in FIGS. 2 and 3, the crop sensor 33 (corresponding to a crop sensor that is provided forward of the entrance 3a of the conveying part 3 in the reaping part 4 (the harvesting part)) is provided forward of the crop sensors 31, 32, and 34 (corresponding to crop sensors that are provided at a right-side position and a left-side position relative to the entrance 3a of the conveying part 3 in the reaping part 4 (the harvesting part)).

As shown in FIGS. 2 and 3, the crop sensor 33 is located forward (outside) of the trajectories of rotation of the raking portions 17d of the lateral conveying member 17, and, in plan view, is located slightly to the right of the center CL2 of the entrance 3a of the conveying part 3 in the left-right direction (on the side of the crop sensors 31 and 32) (on the side of the center CL1 of the reaping part 4 in the left-right direction).

As shown in FIG. 2, the position of the crop sensor 33 and the positions of the right spiral portion 17b and the left spiral portion 17c are different from each other in the left-right direction. Therefore, the crop sensor 33 does not interfere with the right spiral portion 17b and the left spiral portion 17c of the lateral conveying member 17.

Configurations of Crop Sensors

Figure 4:
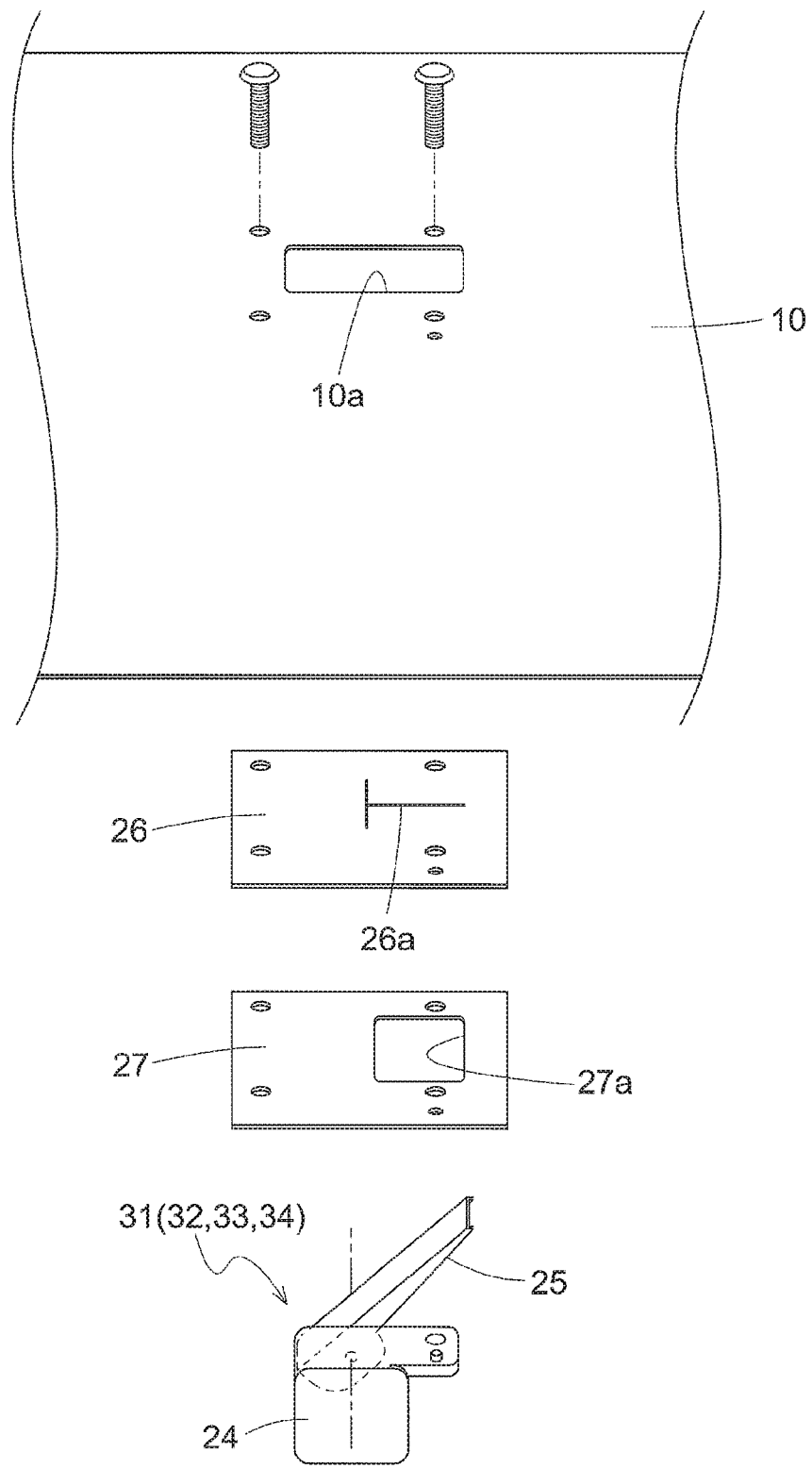
FIG. 4 is an exploded perspective view showing a supporting structure for crop sensors.

As shown in FIG. 4, the crop sensors 31 to 34 each include a body 24 and a detector 25 that is supported so as to be swingable about an axis P5 of the body 24. The detector 25 has an arm-shape that extends from the body 24, and is biased upward (toward the non-detection state side) by a spring (not shown) that is housed in the body 24.

As shown in FIG. 4, in the frame member 9, an opening 10a is formed in the bottom portion 10, and a gap filling member 26 that is formed from a soft rubber plate or the like, and a holding plate 27 are provided. A slit 26a that has a T-shape is formed in the gap filling member 26, and an opening 27a is formed in the holding plate 27.

As shown in FIG. 4, the gap filling member 26 is abutted against the lower surface of the bottom portion 10 such that the slit 26a of the gap filling member 26 is located so as to coincide with the opening 10a of the bottom portion 10. The holding plate 27 is abutted against the lower surface of the gap filling member 26 such that the opening 27a of the holding plate 27 is located so as to coincide with the slit 26a of the gap filling member 26 and the opening 10a of the bottom portion 10, and thus the gap filling member 26 is fixed to the lower surface of the bottom portion 10 by the holding plate 27.

As shown in FIG. 4, the body 24 of each crop sensor 31-34 is coupled to the lower surface of the holding plate 27, and the detector 25 of the crop sensor 31-34 passes through the opening 27a of the holding plate 27, the slit 26a of the gap filling member 26, and the opening 10a of the bottom portion 10, and protrudes obliquely upward.

The state shown in FIG. 3 is a state in which stalks are not in contact with the detector 25 of the crop sensor 31-34, and in which the crop sensor 31-34 does not detect stalks. In this state, the gap between the detector 25 and the opening 10a of the bottom portion 10 of the crop sensor 31-34 is filled by the gap filling member 26, and therefore grains will not pass through the opening 10a of the bottom portion 10 and fall out.

In the state shown in FIG. 3, upon the detectors 25 of the crop sensors 31 to 34 coming into contact with stalks, the detectors 25 of the crop sensors 31 to 34 are pressed downward by the stalks and swing to enter the slits 26a of the gap filling members 26, and thus the crop sensors 31 to 34 enter a state in which the crop sensors 31 to 34 detect stalks.

In a state in which the crop sensors 31 to 34 detect stalks, the detector 25 of each of the crop sensors 31 to 34 closes the opening 10a of the bottom portion 10 corresponding thereto, and the detector 25 and the upper surface of the bottom portion 10 of the crop sensor 31-34 are substantially flush with each other. With this configuration, the flow of stalks will not be obstructed by the detectors 25 of the crop sensors 31 to 34, and grains will not pass through the opening 10a of the bottom portion 10 and fall out.

As shown in FIGS. 2 to 4, in the crop sensors 31 and 32, the axis P5 of the body 24 of the crop sensors 31 and 32 extends in a front-rear direction, and the detector 25 of the crop sensors 31 and 32 extends obliquely leftward (toward the center CL1 of the reaping part 4 in the left-right direction) (toward the entrance 3a of the conveying part 3) and upward.

As shown in FIGS. 2 to 4, in the crop sensor 33, the axis P5 of the body 24 of the crop sensor 33 extends in a left-right direction, and the detector 25 of the crop sensor 33 extends obliquely rearward (toward the entrance 3a of the conveying part 3) and upward.

As shown in FIGS. 2 to 4, in the crop sensor 34, the axis P5 of the body 24 of the crop sensor 34 extends in a front-rear direction, and the detector 25 of the crop sensor 34 extends obliquely rightward (toward the center CL1 of the reaping part 4 in the left-right direction) (toward the entrance 3a of the conveying part 3) and upward.

Detection of Stalks Performed by Crop Sensors and Harvest Crop Sensors

As shown in FIG. 2, when the area between the right and left dividers 14 is divided into four areas A1, A2, A3, and A4, the crop sensor 31 corresponds to the area A1, the crop sensor 32 corresponds to the area A2, the crop sensor 33 corresponds to the area A3, and the crop sensor 34 corresponds to the area A4.

As shown in FIG. 2, if stalks enter the area A1, the stalks are conveyed to the left by the right spiral portion 17b of the lateral conveying member 17, are supplied to the entrance 3a of the conveying part 3 by the raking portions 17d of the lateral conveying member 17, and come into contact with the crop sensor 31, and the crop sensor 31 detects the stalks. In this case, the stalks come into contact with the crop sensor 31 and thereafter come into contact with the crop sensor 32 as well. Therefore, the crop sensor 32 also detects the stalks.

As shown in FIG. 2, if stalks enter the area A2, the stalks are conveyed to the left by the right spiral portion 17b of the lateral conveying member 17, are supplied to the entrance 3a of the conveying part 3 by the raking portions 17d of the lateral conveying member 17, and come into contact with the crop sensor 32, and the crop sensor 32 detects the stalks.

As shown in FIG. 2, if stalks enter the area A3, the stalks come into contact with the crop sensor 33 while being conveyed rearward by the raking portions 17d of the lateral conveying member 17, and are supplied to the entrance 3a of the conveying part 3, and the crop sensor 33 detects the stalks.

As shown in FIG. 2, if stalks enter the area A4, the stalks are conveyed to the right by the left spiral portion 17c of the lateral conveying member 17, are supplied to the entrance 3a of the conveying part 3 by the raking portions 17d of the lateral conveying member 17, and come into contact with the crop sensor 34, and the crop sensor 34 detects the stalks.

As shown in FIG. 2, the crop sensors 31, 32, and 34 overlap the trajectories of rotation of the right spiral portion 17b and the left spiral portion 17c of the lateral conveying member 17 in plan view. Therefore, due to the rotation of the right spiral portion 17b and the left spiral portion 17c of the lateral conveying member 17, stalks are pressed against the crop sensors 31, 32, and 34, and the crop sensors 31, 32, and 34 reliably detect the stalks.

Similarly, as shown in FIG. 2, the crop sensor 33 is located lateral to the trajectories of rotation of the raking portions 17d of the lateral conveying member 17 in plan view. Therefore, due to the rotation of the raking portions 17d of the lateral conveying member 17, stalks are pressed against the crop sensor 33, and the crop sensor 33 reliably detects the stalks.

As shown in FIGS. 2 and 3, if stalks that have entered the areas A1, A2, and A4 are conveyed to the left (right) by the right spiral portion 17b (the left spiral portion 17c) of the lateral conveying member 17, the stalks will not come into contact with the crop sensor 33 and the crop sensor 33 will not detect the stalks because the crop sensor 33 is located forward of the crop sensors 31, 32, and 34.

As shown in FIGS. 2 and 3, regarding the right and left harvest crop sensors 22 and 23, if stalks enter the areas A1 and A2, the right harvest crop sensor 22 enters a state in which stalks are detected, and the left harvest crop sensor 23 enters a state in which stalks are detected or a state in which stalks are not detected.

If stalks enter the area A3, at least one of the right and left harvest crop sensors 22 and 23 enters a state in which stalks are detected.

If stalks enter the area A4, the right harvest crop sensor 22 enters a state in which stalks are detected or not detected, and the left harvest crop sensor 23 enters a state in which stalks are detected.

Patterns of Stalk Detection Performed by Crop Sensors

Patterns B1 to B9 of stalk detection that is performed by the crop sensors 31 to 34 and the harvest crop sensors 22 and 23, and a reaping width W1, which is the left-right width of stalks entering the reaping part 4 from the farm field, are described below.

As shown in the detection pattern B1 in FIG. 5, if the crop sensors 31 to 34 enter a detection state ON and the right and left harvest crop sensors 22 and 23 enter a detection state ON, it can be determined that the reaping width W1 spans the areas A1 to A4. In this case, if the right or left harvest crop sensor 22 or 23 enters a non-detection state OFF, it can be determined that an abnormality has occurred.

As shown in the detection pattern B2 in FIG. 5, if the crop sensors 31 to 33 enter a detection state ON, the crop sensor 34 enters a non-detection state OFF, the right harvest crop sensor 22 enters a detection state ON, and the left harvest crop sensor 23 enters a detection state ON or a non-detection state OFF, it can be determined that the reaping width W1 spans the areas A1 to A3. In this case, if the right harvest crop sensor 22 enters a non-detection state OFF, it can be determined that an abnormality has occurred.

As shown in the detection pattern B3 in FIG. 5, if the crop sensor 31 enters a non-detection state OFF, the crop sensors 32 to 34 enter a detection state ON, and the right and left harvest crop sensors 22 and 23 enter a detection state ON, it can be determined that the reaping width W1 spans the areas A2 to A4. In this case, if the right or left harvest crop sensor 22 or 23 enters a non-detection state OFF, it can be determined that an abnormality has occurred.

As shown in the detection pattern B4 in FIG. 5, if the crop sensors 31 and 32 enter a detection state ON, the crop sensors 33 and 34 enter a non-detection state OFF, the right harvest crop sensor 22 enters a detection state ON, and the left harvest crop sensor 23 enters a detection state ON or a non-detection state OFF, it can be determined that the reaping width W1 spans the areas A1 and A2. In this case, if the right harvest crop sensor 22 enters a non-detection state OFF, it can be determined that an abnormality has occurred.

As shown in the detection pattern B5 in FIG. 5, if the crop sensors 31 and 34 enter a non-detection state OFF, the crop sensors 32 and 33 enter a detection state ON, the right harvest crop sensor 22 enters a detection state ON, and the left harvest crop sensor 23 enters a detection state ON or a non-detection state OFF, it can be determined that the reaping width W1 spans the areas A2 and A3. In this case, if the right harvest crop sensor 22 enters a non-detection state OFF, it can be determined that an abnormality has occurred.

As shown in the detection pattern B6 in FIG. 5, if the crop sensors 31 and 32 enter a non-detection state OFF, the crop sensors 33 and 34 enter a detection state ON, the right harvest crop sensor 22 enters a detection state ON or a non-detection state OFF, and the left harvest crop sensor 23 enters a detection state ON, it can be determined that the reaping width W1 spans the areas A3 and A4. In this case, if the left harvest crop sensor 23 enters a non-detection state OFF, it can be determined that an abnormality has occurred.

Figures 6, 7:
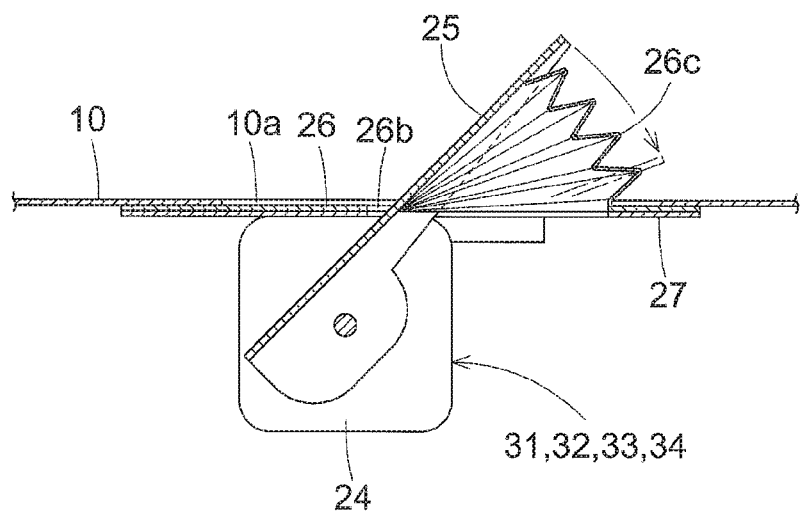
FIG. 6 is a diagram showing patterns of stalk detection that is performed by the crop sensors.
FIG. 7 is a cross-sectional view of an area around a crop sensor according to a first variation of a first embodiment.

As shown in the detection pattern B7 in FIG. 6, if the crop sensors 31, 33, and 34 enter a non-detection state OFF, the crop sensor 32 enters a detection state ON, the right harvest crop sensor 22 enters a detection state ON, and the left harvest crop sensor 23 enters a detection state ON or a non-detection state OFF, it can be determined that the reaping width W1 spans the area A2. In this case, if the right harvest crop sensor 22 enters a non-detection state OFF, it can be determined that an abnormality has occurred.

As shown in the detection pattern B8 in FIG. 6, if the crop sensors 31, 32, and 34 enter a non-detection state OFF, the crop sensor 33 enters a detection state ON, the right harvest crop sensor 22 enters a detection state ON or a non-detection state OFF, and the left harvest crop sensor 23 enters a detection state ON or a non-detection state OFF, it can be determined that the reaping width W1 spans the area A3. In this case, if both the right and left harvest crop sensors 22 and 23 enter a non-detection state OFF, it can be determined that an abnormality has occurred.

As shown in the detection pattern B9 in FIG. 6, if the crop sensors 31 to 33 enter a non-detection state OFF, the crop sensor 34 enters a detection state ON, the right harvest crop sensor 22 enters a detection state ON or a non-detection state OFF, and the left harvest crop sensor 23 enters a detection state ON, it can be determined that the reaping width W1 spans the area A4. In this case, if the left harvest crop sensor 23 enters a non-detection state OFF, it can be determined that an abnormality has occurred.

First Embodiment

The following describes various examples of configurations of the crop sensors as a first embodiment.

First Variation of First Embodiment

The crop sensors 31 to 34 may be configured as shown in FIG. 7.

As shown in FIG. 7, the slit 26a of the gap filling member 26 is omitted, and the gap filling member 26 is provided with an opening 26b and a bellowed portion 26c.

As shown in FIG. 7, the detector 25 of each of the crop sensors 31 to 34 passes through the opening 26b of the gap filling member 26 corresponding thereto and protrudes upward, and the gap between a lower portion of the detector 25 of the crop sensor 31-34 and the opening 10a of the bottom portion 10 is covered by the bellowed portion 26c of the gap filling member 26 corresponding thereto. When stalks come into contact with the detector 25 of the crop sensor 31-34 and the detector 25 swings downward, the bellowed portion 26c of the gap filling member 26 is compressed.

Second Variation of First Embodiment

Figure 8:
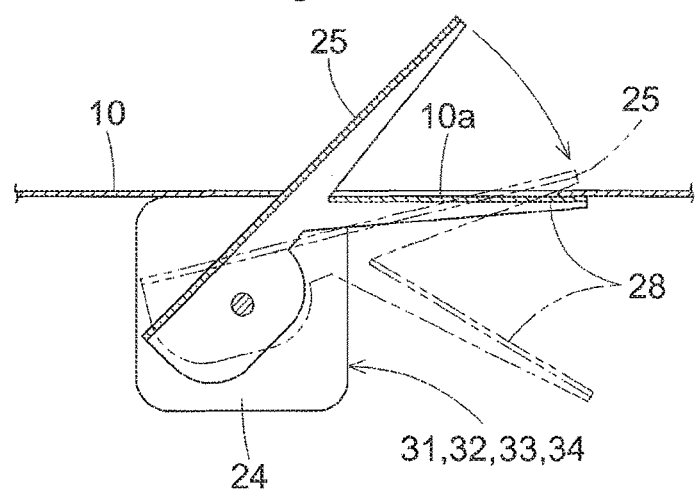
FIG. 8 is a cross-sectional view of an area around a crop sensor according to a second variation of the first embodiment.

The crop sensors 31 to 34 may be configured as shown in FIG. 8.

The gap filling member 26 shown in FIGS. 4 and 7 is omitted, and a gap filling member 28 that is made of a metal or a hard rubber is coupled to the detector 25 of the crop sensor 31-34 as shown in FIG. 8.

As shown in FIG. 8, in a state in which the crop sensors 31 to 34 do not detect stalks, the detector 25 of each of the crop sensors 31 to 34 passes through the opening 10a of the bottom portion 10 and protrudes upward. At this time, the gap filling member 28 is located on the upper side together with the detector 25 of the crop sensor 31-34, and the opening 10a of the bottom portion 10 is filled by the gap filling member 28.

As shown in FIG. 8, when stalks come into contact with the detector 25 of the crop sensor 31-34 and the detector 25 swings downward, the gap filling member 28 moves downward away from the opening 10a of the bottom portion 10. At this time, a leading end portion of the detector 25 of the crop sensor 31-34 abuts against the bottom portion 10, and the opening 10a of the bottom portion 10 is filled by the detector 25 of the crop sensor 31-34.

Third Variation of First Embodiment

Figure 9:
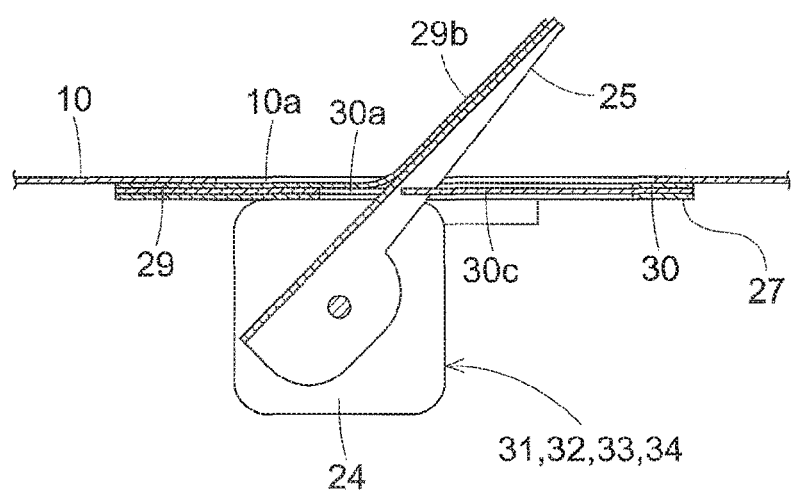
FIG. 9 is a cross-sectional view of an area around a crop sensor according to a third variation of the first embodiment.
Figure 10:
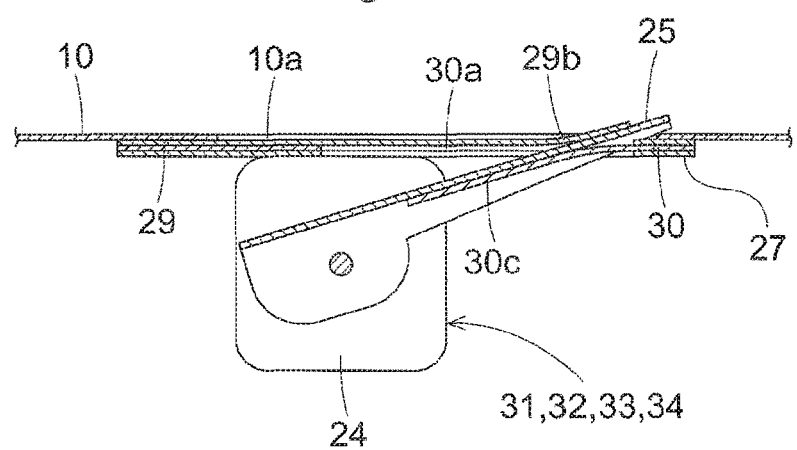
FIG. 10 is a cross-sectional view of an area around a crop sensor according to the third variation of the first embodiment.

The crop sensors 31 to 34 may be configured as shown in FIGS. 9 to 11.

The gap filling member 26 shown in FIGS. 4 and 7 is omitted, and gap filling members 29 and 30 that are formed from a soft rubber plate or the like other than the gap filling member 26 is provided as shown in FIG. 11.

As shown in FIG. 11, a slit 29a that has a channel shape in plan view is formed in the gap filling member 29, and thus a cover portion 29b that can move upward and downward is formed. An opening 30a is formed in the gap filling member 30, two slits 30b are formed so as to extend from the opening 30a, and thus a cover portion 30c that can move upward and downward is formed.

As shown in FIGS. 9 and 11, the gap filling member 29 is located on the upper side, the gap filling member 30 is located on the lower side, and the gap filling members 29 and 30 are fixed to the lower surface of the bottom portion 10 by the holding plate 27.

As shown in FIGS. 9 and 11, the detector 25 of each of the crop sensors 31 to 34 passes through the opening 30a of the gap filling member 30 corresponding thereto and protrudes upward. In a state in which the crop sensors 31 to 34 do not detect stalks, the detector 25 of each of the crop sensors 31 to 34 presses the cover portion 29b of the gap filling member 29 upward.

As shown in FIGS. 9 and 11, the opening 30a of the gap filling member 30 is covered by the cover portion 29b of the gap filling member 29, and an opening that is formed in the gap filling member 29 as a result of the cover portion 29b of the gap filling member 29 being pressed upward is filled by the cover portion 30c of the gap filling member 30.

As shown in FIGS. 10 and 11, when stalks come into contact with the detector 25 of each of the crop sensors 31 to 34 and the detector 25 swings downward, the detector 25 of the crop sensor 31-34 presses the cover portion 30c of the gap filling member 30 downward, and the cover portion 29b of the gap filling member 29 moves downward along with the detector 25 of the crop sensor 31-34.

As shown in FIGS. 10 and 11, an opening formed so as to extend from the opening 30a of the gap filling member 30 to the cover portion 30c as a result of the cover portion 30c of the gap filling member 30 being pressed downward is covered by the detector 25 of the crop sensor 31-34 and the cover portion 29b of the gap filling member 29.

Fourth Variation of First Embodiment

Figure 12:
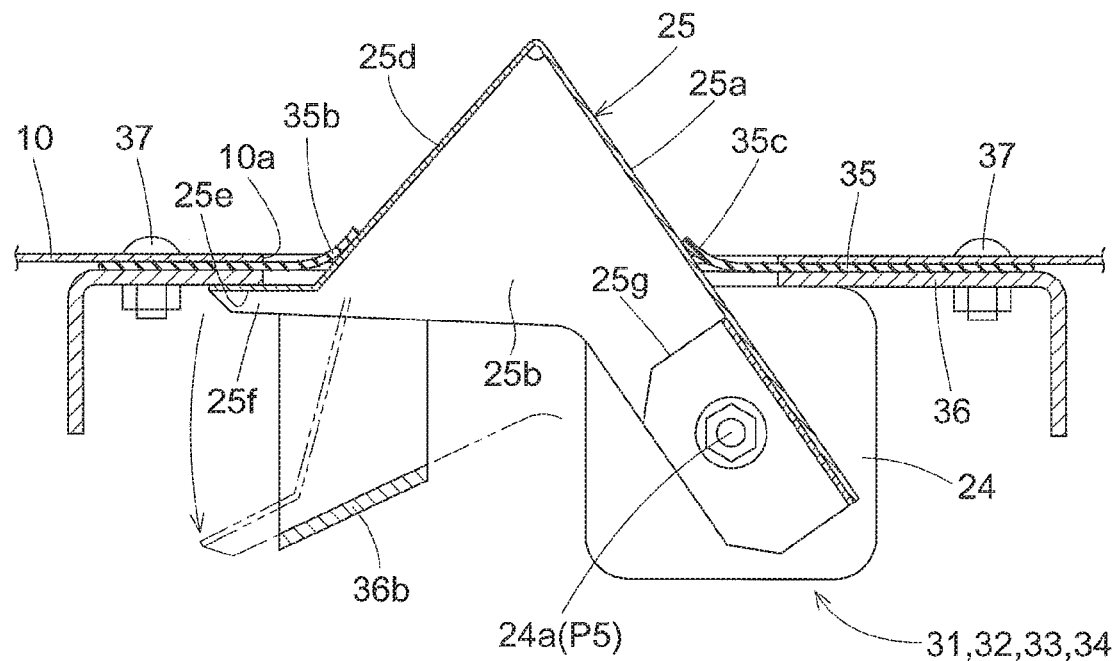
FIG. 12 is a front cross-sectional view of an area around a crop sensor according to a fourth variation of the first embodiment.
Figure 13:
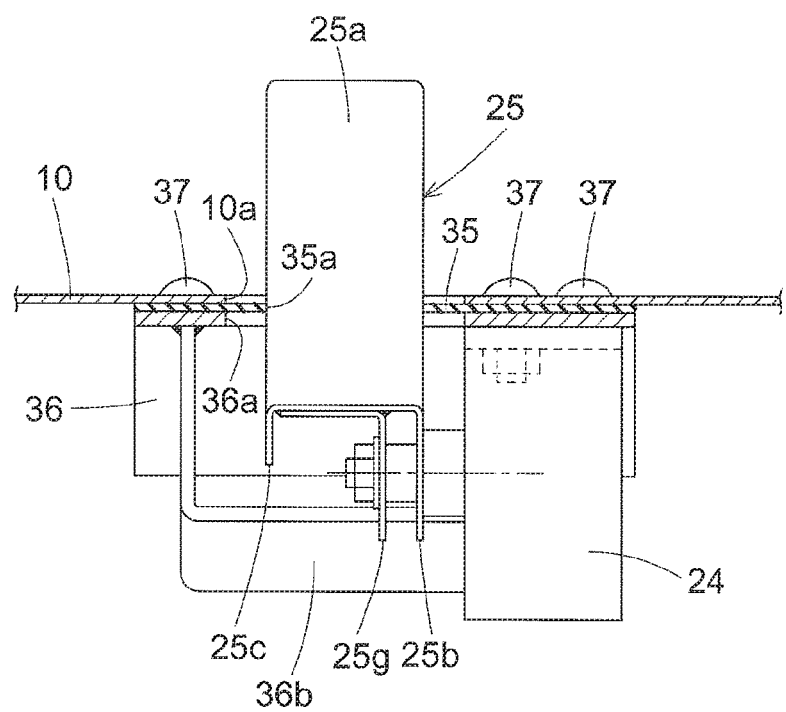
FIG. 13 is a front cross-sectional view of an area around a crop sensor according to the fourth variation of the first embodiment.

The crop sensors 31 to 34 may be configured as shown in FIGS. 12 to 14.

The configurations of the crop sensors 31 to 34 are described below.

The detector 25 of each of the crop sensors 31 to 34 is provided with an upper portion 25a, three wall portions 25b, 25c, and 25d that extend downward from the outer peripheral portion of the upper portion 25a, an upper stopper 25e that extends laterally from a lower portion of the wall portion 25b, a lower stopper 25f that extends laterally from lower portions of the wall portions 25b and 25c, and a middle wall portion 25g that is fixed to an intermediate portion of the upper portion 25a so as to extend downward.

The detector 25 of each of the crop sensors 31 to 34 is formed by bending a plate member so as to have a box shape due to the upper portion 25a and the wall portions 25b, 25c, and 25d, with the lower side thereof, which is rectangular in plan view, being open (corresponding to a state in which a portion of the detector 25 protruding from the opening 10a has a box shape due to the wall portions 25b, 25c, and 25d).

A detection shaft 24a of the body 24 is inserted into an opening (not shown) that is defined by the wall portion 25b and the middle wall portion 25g of the detector 25 of the crop sensor 31-34, and thus the detector 25 is coupled to the detection shaft 24a of the body 24. The detection shaft 24a of the body 24 of the crop sensor 31-34 is rotatable, and thus the detector 25 is supported so as to be swingable about the axis P5 of the body 24, and the detector 25 is biased upward (toward the non-detection state side) by a spring (not shown) that is housed in the body 24.

A gap filling member 35 that is formed from a soft rubber plate or the like, and a holding plate 36 are provided. An opening 35a that is rectangular is formed in the gap filling member 35, and a long extension portion 35b and a short extension portion 35c are formed at one and the other of the short sides of the opening 35a.

The holding plate 36 is formed from a metal plate member, and is provided with an opening 36a that is rectangular. The holding plate 36 is provided with a receiving portion 36b that is bent into a U-shape, and the receiving portion 36b is coupled to a position near an end portion the opening 36a.

The gap filling member 35 is abutted against the lower surface of the bottom portion 10 such that the opening 35a of the gap filling member 35 is located so as to coincide with the opening 10a of the bottom portion 10.

The holding plate 36 is abutted against the lower surface of the gap filling member 35 such that the opening 36a of the holding plate 36 is located so as to coincide with the opening 35a of the gap filling member 35 and the opening 10a of the bottom portion 10 and the receiving portion 36b of the holding plate 36 is located below the extension part 35b of the gap filling member 35.

The holding plate 36 is coupled to the bottom portion 10, using a bolt 37, and the gap filling member 35 is fixed to the lower surface of the bottom portion 10 by the holding plate 36 so as to be sandwiched between the bottom portion 10 and the holding plate 36.

The body 24 of the crop sensor 31-34 is fixed to the lower surface of the holding plate 36, using the bolt 37, in a fastened state, and the detector 25 of the crop sensor 31-34 passes through the opening 36a of the holding plate 36, the opening 35a of the gap filling member 35, and the opening 10a of the bottom portion 10, and protrudes obliquely upward.

Stalk detection that is performed by the crop sensors 31 to 34 is described below.

The state shown in FIGS. 12 and 13 is a state in which stalks are not in contact with the detector 25 of the crop sensor 31-34, and in which the crop sensor 31-34 does not detect stalks.

In this state, the upper stopper 25e of the detector 25 of the crop sensor 31-34 abuts against an edge of the opening 36a of the holding plate 36 from below, and the upper stopper 25e abuts against the frame member 9 with the holding plate 36 being interposed therebetween. This state is a state in which the detector 25 of the crop sensor 31-34 is located at the upper swing limit, and the detector 25 cannot swing further upward.

In this state, the extension portion 35b of the gap filling member 35 is in contact with the wall portion 25d, the extension portion 35c of the gap filling member 35 is in contact with the upper portion 25a of the detector 25 of the crop sensor 31-34, and the long sides of the opening 35a of the gap filling member 35 are in contact with the wall portions 25b and 25c of the detector 25 of the crop sensor 31-34.

As a result, the gap between the detector 25 of the crop sensor 31-34 and the opening 10a of the bottom portion 10 is filled by the wall portions 25b, 25c, and 25d of the detector 25 of the crop sensor 31-34 and the gap filling member 35, and grains do not pass through the opening 10a of the bottom portion 10 and fall out.

In the state shown in FIGS. 12 and 13, upon stalks coming into contact with the detector 25 of the crop sensor 31-34, the detector 25 of the crop sensor 31-34 is pressed downward by the stalks, swings so as to enter the opening 35a of the gap filling member 26, and the crop sensor 31-34 enters a state in which stalks are detected.

If the detector 25 of the crop sensor 31-34 swings downward, when the lower stopper 25f of the detector 25 of the crop sensor 31-34 and lower end portions of the wall portions 25b and 25c abut against the receiving portion 36b of the holding plate 36 from above, the detector 25 of the crop sensor 31-34 enters the state of being located at the lower swing limit.

This state is a state in which the lower stopper 25f of the detector 25 of the crop sensor 31-34 abuts against the frame member 9 with the holding plate 36 (the receiving portion 36b) being interposed therebetween, and the detector 25 cannot swing further downward.

When the detector 25 of the crop sensor 31-34 reaches the lower swing limit, the detector 25 of the crop sensor 31-34 closes the opening 35a of the gap filling member 35 and the opening 10a of the bottom portion 10, and the upper portion 25a of the detector 25 of the crop sensor 31-34 and the upper surface of the bottom portion 10 are substantially flush with each other.

With this configuration, the flow of stalks is not obstructed by the detectors 25 of the crop sensors 31 to 34, and grains will not pass through the opening 10a of the bottom portion 10 and fall out.

Fifth Variation of First Embodiment

Figure 15:
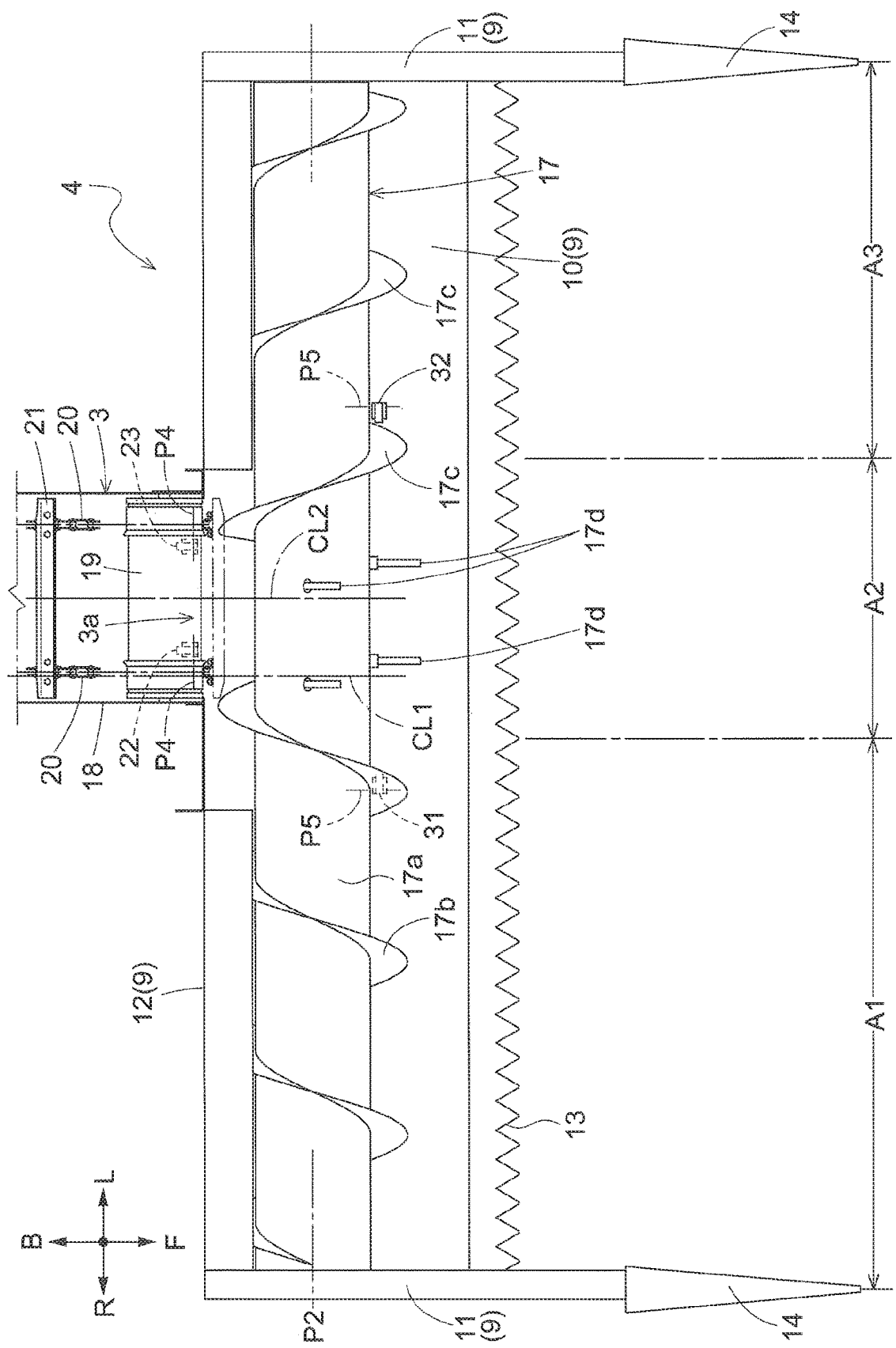
FIG. 15 is a plan view showing an arrangement of the crop sensors according to a fifth variation of the first embodiment.

The crop sensors 31 to 34 shown in FIG. 4 and the crop sensors 31 to 34 shown in "First Variation of First Embodiment" to "Fourth Variation of First Embodiment" may be arranged as shown in FIG. 15.

As shown in FIG. 15, two crop sensors 31 and 32 are provided in the reaping part 4.

The crop sensor 31 is provided on the bottom portion 10 of the frame member 9 at a position that is forward of the right spiral portion 17b of the lateral conveying member 17 (corresponding to a position on the right side of the entrance 3a of the conveying part 3 in the reaping part 4 (the harvesting part)).

The crop sensor 32 is provided on the bottom portion 10 of the frame member 9 at a position that is forward of the left spiral portion 17c of the lateral conveying member 17 (corresponding to a position on the left side of the entrance 3a of the conveying part 3 in the reaping part 4 (the harvesting part)).

With this configuration, the crop sensors 31 and 32 are provided in the reaping part 4 (the harvesting part) with an interval in a left-right direction. That is to say, in the reaping part 4 (the harvesting part), the crop sensors 31 and 32 are distributed on the right side and the left side of the center CL2 of the entrance 3a of the conveying part 3 in the left-right direction. Furthermore, the crop sensors 31 and 32 are provided on a portion of the frame member 9, located below the lateral conveying member 17.

The crop sensor 31 overlaps the trajectory of rotation of the right spiral portion 17b of the lateral conveying member 17 in plan view, and the crop sensor 32 overlaps the trajectory of rotation of the left spiral portion 17c of the lateral conveying member 17 in plan view.

The crop sensors 31 and 32 are located forward (outside) of the trajectories of rotation of the right spiral portion 17b and the left spiral portion 17c of the lateral conveying member 17 in a side view, and the crop sensors 31 and 32 do not interfere with the right spiral portion 17b and the left spiral portion 17c of the lateral conveying member 17. The positions of the crop sensors 31 and 32 are different from each other in the left-right direction. Therefore, the crop sensors 31 and 32 do not interfere with the raking portions 17d of the lateral conveying member 17.

In the crop sensor 31, the axis P5 of the body 24 of the crop sensor 31 extends in a front-rear direction, and the detector 25 of the crop sensor 31 extends obliquely leftward (toward the center CL1 of the reaping part 4 in the left-right direction) (toward the entrance 3a of the conveying part 3) and upward.

In the crop sensor 32, the axis P5 of the body 24 of the crop sensor 32 extends in a front-rear direction, and the detector 25 of the crop sensor 32 extends obliquely rightward (toward the center CL1 of the reaping part 4 in the left-right direction) (toward the entrance 3a of the conveying part 3) and upward.

Stalk detection that is performed by the crop sensors 31 and 32 and the harvest crop sensors 22 and 23 is described below.

As shown in FIG. 15, when the area between the right and left dividers 14 is divided into three areas A1, A2, and A3, the crop sensor 31 corresponds to the area A1, the harvest crop sensors 22 and 23 correspond to the area A2, and the crop sensor 32 corresponds to the area A3.

If stalks enter the area A1, the stalks are conveyed to the left by the right spiral portion 17b of the lateral conveying member 17, are supplied to the entrance 3a of the conveying part 3 by the raking portions 17d of the lateral conveying member 17, and come into contact with the crop sensor 31, and the crop sensor 31 detects the stalks.

If stalks enter the area A2, the stalks are supplied to the entrance 3a of the conveying part 3 while being conveyed rearward by the raking portions 17d of the lateral conveying member 17, and the right and left harvest crop sensors 22 and 23 detect the stalks.

If stalks enter the area A3, the stalks are conveyed to the right by the left spiral portion 17c of the lateral conveying member 17, are supplied to the entrance 3a of the conveying part 3 by the raking portions 17d of the lateral conveying member 17, and come into contact with the crop sensor 32, and the crop sensor 32 detects the stalks.

Regarding the right and left harvest crop sensors 22 and 23, if stalks enter the area A1, the right harvest crop sensor 22 enters a state in which stalks are detected, and the left harvest crop sensor 23 enters a state in which stalks are detected or not detected.

If stalks enter the area A2, at least one of the right and left harvest crop sensors 22 and 23 enters a state in which stalks are detected.

If stalks enter the area A3, the right harvest crop sensor 22 enters a state in which stalks are detected or not detected, and the left harvest crop sensor 23 enters a state in which stalks are detected.

Patterns of stalk detection that is performed by the crop sensors 31 and 32 and the harvest crop sensors 22 and 23 are described below.

Figures 16, 17:
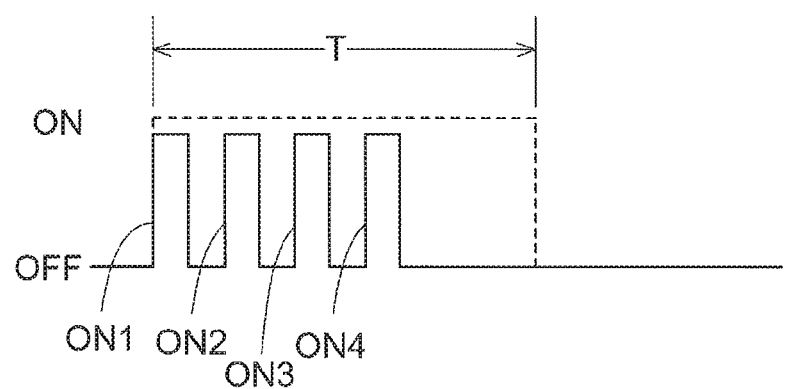
FIG. 16 is a diagram showing patterns of stalk detection that is performed by the crop sensors according to the fifth variation of the first embodiment.
FIG. 17 is a diagram showing a detection state and a non-detection state of the crop sensors according to a seventh variation of the first embodiment.

Patterns B11 to B14 of stalk detection that is performed by the crop sensors 31 and 32 and the harvest crop sensors 22 and 23, and the reaping width W1, which is the left-right width of stalks entering the reaping part 4 from the farm field, are shown in FIG. 16.

As shown in the detection pattern B11, if the crop sensors 31 and 32 enter a detection state ON and the right and left harvest crop sensors 22 and 23 enter a detection state ON, it can be determined that the reaping width W1 spans the areas A1, A2, and A3. In this case, if the right or left harvest crop sensor 22 or 23 enters a non-detection state OFF, it can be determined that an abnormality has occurred.

As shown in the detection pattern B12, if the crop sensor 31 enters a detection state ON, the crop sensor 32 enters a non-detection state OFF, the right harvest crop sensor 22 enters a detection state ON, and the left harvest crop sensor 23 enters a detection state ON or a non-detection state OFF, it can be determined that the reaping width W1 spans the areas A1 and A2, or the area A1. In this case, if the right harvest crop sensor 22 enters a non-detection state OFF, it can be determined that an abnormality has occurred.

As shown in the detection pattern B13, if the crop sensor 31 enters a non-detection state OFF, the crop sensor 32 enters a detection state ON, the right harvest crop sensor 22 enters a detection state ON or a non-detection state OFF, and the left harvest crop sensor 23 enters a detection state ON, it can be determined that the reaping width W1 spans the areas A2 and A3, or the area A3. In this case, if the left harvest crop sensor 23 enters a non-detection state OFF, it can be determined that an abnormality has occurred.

As shown in the detection pattern B14, if the crop sensors 31 and 32 enter a non-detection state OFF and the right and left harvest crop sensors 22 and 23 enter a detection state ON, it can be determined that the reaping width W1 spans the area A2.

Sixth Variation of First Embodiment

In "Fifth Variation of First Embodiment" described above, the third crop sensor 33 may be provided forward of the raking portions 17d of the lateral conveying member 17 shown in FIG. 15 (forward of the entrance 3a of the conveying part 3) (see the crop sensor 33 in FIG. 2).

With this configuration, in the detection pattern B12 in FIG. 16, if the crop sensor 33 is in a detection state ON, it can be determined that the reaping width W1 spans the areas A1 and A2. If the crop sensor 33 is in a non-detection state OFF, it can be determined that the reaping width W1 spans the area A1.

In the detection pattern B13 in FIG. 16, if the crop sensor 33 is in a detection state ON, it can be determined that the reaping width W1 spans the areas A2 and A3. If the crop sensor 33 is in a non-detection state OFF, it can be determined that the reaping width W1 spans the area A3.

Seventh Variation of First Embodiment

Regarding stalk detection that is performed by the crop sensors 31 to 34, the following configuration may be employed.

The amount of stalk that enters the reaping part 4 varies in each area of the farm field depending on the growing conditions in the farm field, and it is not always the case that a sufficient amount of stalk for the crop sensors 31 to 34 to enter a detection state ON is guided to the reaping part 4.

Therefore, when reaping is performed by the reaping part 4, a state in which stalks guided to the reaping part 4 come in contact with the crop sensors 31 to 34 and a state in which such stalks do not come in contact with the crop sensors 31 to 34 alternatingly occur.

In the above-described state, as shown in FIG. 17, it is envisaged that detection signals ON1, ON2, ON3, and ON4 are repeatedly output from the crop sensors 31 to 34 in a non-detection state OFF.

In this case, it will be determined that the crop sensors 31 to 34 are in a detection state ON until a set time T has elapsed from when the first detection signal ON1 has been output, even if the detection signals ON2, ON3, and ON4 are repeatedly output from the crop sensors 31 to 34 and stopped (see the dotted line in FIG. 17).

After the set time T has elapsed, if the reaping part 4 is still performing reaping, the crop sensors 31 to 34 immediately output the next detection signal ON1, the setting time T is set again, and it is determined that the crop sensors 31 to 34 are in a detection state ON.

As a result, during a period in which the reaping part 4 is performing reaping, it is determined that the crop sensors 31 to 34 are in a detection state ON even if a state in which stalks come in contact with the crop sensors 31 to 34 and a state in which stalks do not come in contact with the crop sensors 31 to 34 repeatedly occur in the areas A1 to A4 to which stalks are guided.

The set time T may be set to a constant time (e.g. 1 second).

The set time T may be changed according to the travel speed of the machine body 1.

That is to say, if the machine body 1 travels a certain distance, it is necessary to change the set time T according to the varying travel speed of the machine body 1, assuming that stalks are likely to be present (the crop sensors 31 to 34 are likely to output a detection signal) in a certain distance (e.g. 2 m) from a point at which the crop sensors 31 to 34 output a detection signal.

If the set time T is to be changed according to the travel speed of the machine body 1, a speed sensor (not shown) for detecting the travel speed of the machine body 1 may be provided, and if the travel speed of the machine body 1 increases to a high speed, the set time T may be reduced, and if the travel speed of the machine body 1 decreases to a low speed, the set time T may be increased.

A combine repeats work cycles in each of which, when the combine reaches a ridge edge after completing one reaping process along one side of the farm field, the reaping part 4 is stopped and raised from the farm field, the combine turns at the ridge edge, and starts the next reaping process.

As a result, the processing shown in FIG. 17 is performed in a state in which the reaping part 4 performs reaping, i.e. a reaping clutch (not shown) that transmits power to the reaping part 4 has been switched ON.

In a state in which the reaping part 4 is not performing reaping, such as when the combine turns at a ridge edge, i.e. in a state in which the reaping clutch has been switched off, the processing shown in FIG. 17 is not performed, and if the detection signals ON1 to ON4 from the crop sensors 31 to 34 stop, it is determined that the crop sensors 31 to 34 are in a non-detection state OFF.

Another Variation of First Embodiment

The upper stopper 25e and the lower stopper 25f of the above-described crop sensors 31 to 34 may be provided in the crop sensors 31 to 34 shown in FIGS. 4 and 7 to 11.

Second Embodiment

The following describes a configuration for controlling the travel speed of a machine body according to the harvesting width, in a harvesting machine (a combine) according to a second embodiment. The harvesting machine (the combine) according to the present embodiment can be implemented together with or independent of the harvesting machine (the combine) according to the first embodiment.

Configuration Related to Detection of Reaping Width and Abnormality

Figure 18:
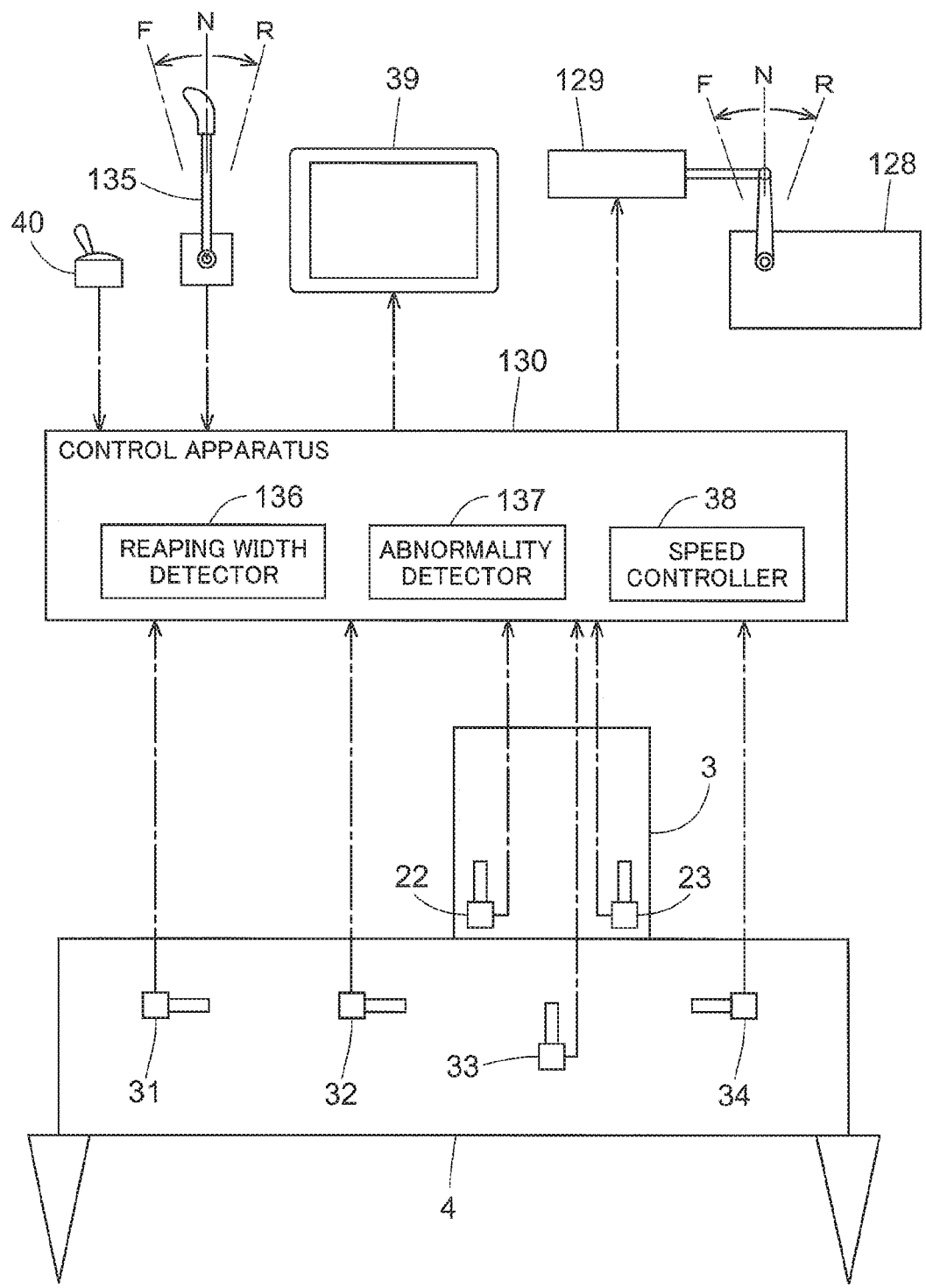
FIG. 18 is a conceptual diagram showing a state of linkage between a control device and various units according to a second embodiment.

As shown in FIG. 18, detection signals from the crop sensors 31 to 34 and the harvest crop sensors 22 and 23 are input to a control apparatus 130, and a reaping width detector 136 (corresponding to a harvesting width detector) and an abnormality detector 137 are provided in the control apparatus 130 as software. The crop sensors 31 to 34 belong to the reaping width detector 136, and are provided in the reaping width detector 136. A display apparatus 39 such as a liquid crystal display is provided in the driver part.

The reaping width detector 136 detects the reaping width W1 based on detection signals from the crop sensors 31 to 34, and the result of detection (the reaping width W1) is displayed on the display apparatus 39.

The abnormality detector 137 detects an abnormality based on detection signals from the crop sensors 31 to 34 and the harvest crop sensors 22 and 23, and if an abnormality is detected, the result of detection is displayed on the display apparatus 39.

Configuration of Travel Transmission System

As shown in FIG. 18, power from an engine (not shown) is transmitted to a hydrostatic-type continuously variable transmission apparatus 128 (corresponding to a travel transmission unit), and power is transmitted from a gear transmission-type auxiliary transmission apparatus (not shown) to the right and left travelling apparatuses 2. The continuously variable transmission apparatus 128 can be steplessly shifted to a neutral position N, a forward side F, and a rearward side R.

The continuously variable transmission apparatus 128 is operated by an electric motor 129, and the electric motor 129 is activated by the control apparatus 130. A shift lever 135 is provided in the driver part, and the shift lever 135 can be switched to the neutral position N, the forward side F, and the rearward side R. The operation position of the shift lever 135 is input to the control apparatus 130.

A speed controller 38 is provided in the control apparatus 130 as software. A manual setting unit 40 through which the speed controller 38 can be manually set to a working state and a stopped state is provided in the driver part, and a signal from the manual setting unit 40 is input to the control apparatus 130.

If the speed controller 38 is set to a stopped state through the manual setting unit 40, the stopped state of the speed controller 38 is displayed on the display apparatus 39. When the speed controller 38 is in a stopped state, if the shift lever 135 is shifted to the neutral position N, the electric motor 129 is activated by the control apparatus 130, and the continuously variable transmission apparatus 128 is shifted to the neutral position N. If the shift lever 135 is shifted toward the forward side F (the rearward side R), the electric motor 129 is activated by the control apparatus 130, and the continuously variable transmission apparatus 128 is shifted toward the forward side F (the rearward side R). Thus, the continuously variable transmission apparatus 128 is shifted to a transmission position corresponding to the operation position of the shift lever 135.

Automatic Control of Travel Speed of Machine Body

As shown in FIG. 18, if the speed controller 38 is set to a working state through the manual setting unit 40, the working state of the speed controller 38 is displayed on the display apparatus 39. Based on the result of detection performed by the reaping width detector 136 (the reaping width W1), the electric motor 129 is activated by the speed controller 38 and the continuously variable transmission apparatus 128 is automatically shifted.

When the speed controller 38 is in a working state, the continuously variable transmission apparatus 128 is automatically shifted to a lower speed on the forward side F by the speed controller 38 as the reaping width W1 increases. The continuously variable transmission apparatus 128 is automatically shifted to a higher speed on the forward side F by the speed controller 38 as the reaping width W1 decreases. The shift position of the continuously variable transmission apparatus 128 is displayed on the display apparatus 39.

When the speed controller 38 is in a working state, if the continuously variable transmission apparatus 128 is automatically shifted by the speed controller 38 to a higher speed, the upper limit position on the high-speed side is the operation position of the shift lever 135, and the continuously variable transmission apparatus 128 cannot be shifted to a higher speed on the forward side F beyond the shift position corresponding to the operation position of the shift lever 135. Thus, it is possible to freely change the above-described upper limit position on the high-speed side by operating the shift lever 135.

When the speed controller 38 is in a working state, if the shift lever 135 is shifted toward the rearward side R, the speed controller 38 temporarily enters a stopped state, and the continuously variable transmission apparatus 128 is shifted to a shift position on the rearward side R corresponding to the operation position of the shift lever 135. Next, if the shift lever 135 is shifted toward the forward side F, the speed controller 38 returns to a working state.

For example, when the reaping part 4 is plunged into stalks in the farm field, such as at the beginning of a single reaping process, a state in which the reaping width W1 does not exist suddenly turns into a state in which the reaping width W1 exists.

When the speed controller 38 is in a working state, if the above-described situation occurs, the continuously variable transmission apparatus 128 is more quickly shifted by the speed controller 38 toward the low-speed side on the forward side F than when the continuously variable transmission apparatus 128 is shifted toward the low-speed side during reaping work.

For example, when the reaping part 4 stops reaping stalks in the farm field, such as at the end of a single reaping process, a state in which the reaping width W1 exists suddenly turns into a state in which the reaping width W1 does not exist, and thereafter the machine body 1 is often made to turn.

When the speed controller 38 is in a working state, if the above-described situation occurs, the continuously variable transmission apparatus 128 is more gently shifted by the speed controller 38 toward the high-speed side on the forward side F than when the continuously variable transmission apparatus 128 is shifted toward the high-speed side during reaping work.

If stalks in the farm field have fallen over or are close together, the driver may not be able to discern the state of the reaping part 4 even if the driver looks at the reaping part 4 ahead from the driver part. In such a case, the detected reaping width W1 is displayed on the display apparatus 39, and therefore the driver can determine the area to which stalks are guided, of the areas A1 to A4 of the reaping part 4, by visually observing the display apparatus 39. As a result, it is possible to effectively use the reaping width W1 displayed on the display apparatus 39 when correcting the orientation of the machine body 1 during reaping work, for example.

Another Variation of Second Embodiment

Instead of operating the continuously variable transmission apparatus 128, using the electric motor 129, to automatically control the travel speed of the machine body 1, it is possible to operate an accelerator (corresponding to a travel transmission unit) of the engine, using the electric motor 129, to automatically control the travel speed of the machine body 1.

If the shift lever 135 and the continuously variable transmission apparatus 128 are mechanically connected to each other via a linkage or the like, it is possible to operate the continuously variable transmission apparatus 128 by operating the shift lever 135, using the electric motor 129, to automatically control the travel speed of the machine body 1.

Another Variation of First and Second Embodiments

The conveying part 3 may be coupled to the rear portion of the reaping part 4 in an offset manner such that the center CL2 of the entrance 3a of the conveying part 3 in the left-right direction is located slightly to the right of the center CL1 of the reaping part 4 in the left-right direction.

In this configuration, the right spiral portion 17b, the left spiral portion 17c, and the raking portions 17d of the lateral conveying member 17 and the crop sensors 31 to 34 are to be arranged the other way around in the left-right direction compared to the state shown in FIGS. 2 and 15.

The conveying part 3 may be coupled to the rear portion of the reaping part 4 such that the center CL2 of the entrance 3a of the conveying part 3 in the left-right direction is located at the center CL1 of the reaping part 4 in the left-right direction, and the right spiral portion 17b and the left spiral portion 17c of the lateral conveying member 17 have the same length.

In this configuration, the crop sensor 33 is to be located at the center CL2 of the entrance 3a of the conveying part 3 in the left-right direction, and the same number of crop sensors 31, 32, and 34 are to be arranged forward of the right spiral portion 17b and the left spiral portion 17c of the lateral conveying member 17 so as to be symmetrical with respect to the center CL1 of the reaping part 4 in the left-right direction.

The number of crop sensors 31 to 34 may be five or more, or three or less, instead of being four. The crop sensor 33 located forward of the entrance 3a of the conveying part 3 may be omitted.

In the frame member 9 of the reaping part 4, the crop sensors 31 to 34 may be provided on the rear-side portion 12 instead of on the bottom portion 10. If this is the case, the crop sensors 31 to 34 are to be provided on a portion of the rear side portion 12 lower than the axis P2 of the lateral conveying member 17 (corresponding to a portion that is located below the lateral conveying member, of the frame member).

If the crop sensors 31 to 34 are provided on the rear-side portion 12, a pressure receiving surface that is formed from a rubber member or the like may be provided instead of the detector 25 of each of the crop sensors 31 to 34, and crops may be detected based on an increase in the pressure that the pressure receiving surface receives as a result of stalks abutting against the pressure receiving surface.

It is possible to provide one harvest crop sensor (not shown) on the bottom portion 18a of the supporting case 18 at the entrance 3a of the conveying part 3 instead of providing the right and left harvest crop sensors 22 and 23 on the right side and the left side of the entrance 3a of the conveying part 3. With this configuration, it is possible to detect an abnormality occurring in the crop sensors 31, 32, 33, and 34, using a single harvest crop sensor.

If this is the case, the harvest crop sensor (not shown) is to be provided on the bottom portion 18a of the supporting case 18 at the center CL2 of the entrance 3a of the conveying part 3 in the left-right direction, and the harvest crop sensor (not shown) may be located slightly to the right or the left of the center CL2 of the entrance 3a of the conveying part 3 in the left-right direction.

INDUSTRIAL APPLICABILITY

The present invention is applicable not only to a normal combine for rice, but also to a head-feeding type combine for rice and a harvesting machine such as a corn harvesting machine, a sugarcane harvesting machine, or a cotton harvester.

DESCRIPTION OF REFERENCE SIGNS

1: Machine Body
3: Conveying Part
3a: Entrance
4: Harvesting Part
9: Frame Member
10: Bottom Portion
10a: Opening
17: Lateral Conveying Member
22, 23: Harvest Crop Sensor
25: Detector
25b, 25c, 25d: Wall Portion
25e: Upper Stopper
25f: Lower Stopper
26, 29, 30, 35: Gap Filling Member
128: Travel Transmission Unit
31, 32, 33, 34: Crop Sensor
36: Harvesting Width Detector
38: Speed Controller
CL2: Center in Left-Right Direction
P2: Axis
P5: Axis
W1: Harvesting Width

The invention claimed is:

1. A harvesting machine comprising:
a harvesting part that is provided forward of a machine body, and harvests crops in a farm field; and
a plurality of crop sensors that are provided in the harvesting part at intervals in a left-right direction, and detect the presence of crops upon coming into contact with the crops,
wherein a conveying part that conveys crops from the harvesting part toward the machine body is coupled to a rear portion of the harvesting part,
wherein the harvesting part includes:
a lateral conveying member that is driven to rotate about an axis that extends in a left-right direction so as to convey crops toward an entrance of the conveying part in a left-right direction of the harvesting part; and
a frame member that supports the lateral conveying member so as to be rotatable, and to which the conveying part is coupled,
wherein the crop sensors are provided on the frame member, and wherein the crop sensors are provided on a portion that is located below the lateral conveying member, of the frame member.

2. The harvesting machine according to claim 1, wherein the crop sensors are provided on a bottom portion of the frame member.

3. The harvesting machine according to claim 1, wherein the crop sensors are located outside a trajectory of rotation of the lateral conveying member.

4. The harvesting machine according to claim 1,
wherein openings are formed in the frame member, and detectors of the crop sensors are provided so as to respectively protrude from the openings, and are configured to swing upon coming into contact with crops.

5. The harvesting machine according to claim 4, wherein gap filling members are provided, each gap filling member filling a gap between the detector and the opening corresponding thereto.

6. The harvesting machine according to claim 4, wherein a wall portion that extends downward is provided on an outer peripheral portion of a portion of each detector, the portion protruding from the opening corresponding thereto, and the portion of each detector protruding from the opening corresponding thereto has a box shape due to the wall portion.

7. The harvesting machine according to claim 4, wherein each detector includes an upper stopper that determines an upper swing limit of the detector by abutting against the frame member, and a lower stopper that determines a lower swing limit of the detector by abutting against the frame member.

8. The harvesting machine according to claim 1,
wherein a conveying part that conveys crops from the harvesting part toward the machine body is coupled to a rear portion of the harvesting part, and
the crop sensors are provided in the harvesting part so as to be distributed on a right side and a left side of a center of an entrance of the conveying part in a left-right direction.

9. The harvesting machine according to claim 8, wherein the crop sensors are provided in the harvesting part at a position on the right side of the entrance, a position on the left side of the entrance, and a position that is forward of the entrance.

10. The harvesting machine according to claim 9, wherein the crop sensor that is provided in the harvesting part at the position that is forward of the entrance is located forward of the crop sensors that are provided in the harvesting part at the positions on the right side and the left side of the entrance.

11. The harvesting machine according to claim 9, wherein the crop sensors that are provided in the harvesting part at the positions on the right side and the left side of the entrance each include a detector that swings about an axis that extends in a front-rear direction, upon coming into contact with crops.

12. The harvesting machine according to claim 9, wherein the crop sensor that is provided in the harvesting part at the position that is forward of the entrance includes a detector that swings about an axis that extends in a left-right direction, upon coming into contact with crops.

13. A harvesting machine comprising:
a harvesting part that is provided forward of a machine body, and harvests crops in a farm field;
a threshing apparatus that threshes the crops harvested by the harvesting part;
a harvesting width detector that detects a harvesting width corresponding to crops harvested through harvesting work that has actually been performed, included in a workable width within which harvesting work can be performed by the harvesting part;
a travel transmission unit that changes the travel speed of the machine body; and
a speed controller that shifts the travel transmission unit to a lower speed as the harvesting width increases in order to decrease the load that is applied to the threshing apparatus, and shifts the travel transmission unit to a higher speed as the harvesting width decreases, based on the result of detection performed by the harvesting width detector;
wherein crop sensors that detect the presence of crops upon coming into contact with the crops are included in the harvesting width detector.

14. The harvesting machine according to claim 13,
wherein
two or more crop sensors are provided in the harvesting part at intervals in a left-right direction.

15. The harvesting machine according to claim 13, further comprising:
a conveying part that is coupled to a rear portion of the harvesting part, and conveys crops that have been harvested, from the harvesting part toward the machine body,
wherein harvest crop sensors that detect the presence of crops upon coming into contact with the crops that have been harvested are provided at an entrance of the conveying part.

16. The harvesting machine according to claim 15, wherein the harvest crop sensors are provided on the right side and the left side of the entrance of the conveying part.

17. The harvesting machine according to claim 13,
wherein crop sensors that detect the presence of crops upon coming into contact with the crops are included in the harvesting width detector,
three or more crop sensors are provided in the harvesting part at intervals in a left-right direction, and
at least one crop sensor that is located on a center side, of the crop sensors, is located forward of the entrance of the harvesting part.

* * * * *